US008290358B1

(12) United States Patent
Georgiev

(10) Patent No.: US 8,290,358 B1
(45) Date of Patent: Oct. 16, 2012

(54) METHODS AND APPARATUS FOR LIGHT-FIELD IMAGING

(75) Inventor: Todor G. Georgiev, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 94 days.

(21) Appl. No.: 12/144,411

(22) Filed: Jun. 23, 2008

Related U.S. Application Data

(60) Provisional application No. 60/946,018, filed on Jun. 25, 2007.

(51) Int. Cl.
*G03B 35/00* (2006.01)
(52) U.S. Cl. ....................................... 396/326
(58) Field of Classification Search .............. 396/326, 396/327, 113, 333
See application file for complete search history.

(56) References Cited

U.S. PATENT DOCUMENTS

| | | | |
|---|---|---|---|
| 725,567 A | 4/1903 | Ives | |
| 2,039,648 A | 5/1936 | Ives | |
| 3,743,379 A * | 7/1973 | McMahon | 359/316 |
| 3,985,419 A | 10/1976 | Matsumoto et al. | |
| 4,175,844 A * | 11/1979 | Glaser-Inbari | 396/322 |
| 4,180,313 A * | 12/1979 | Inuiya | 396/330 |
| 4,193,093 A | 3/1980 | St. Clair | |
| 4,230,942 A * | 10/1980 | Stauffer | 250/204 |
| 4,580,219 A | 4/1986 | Pelc et al. | |
| 4,732,453 A | 3/1988 | de montebello et al. | |
| 4,849,782 A | 7/1989 | Koyama et al. | |
| 5,076,687 A | 12/1991 | Adelson | |
| 5,361,127 A | 11/1994 | Daily | |
| 5,400,093 A | 3/1995 | Timmers | |
| 5,659,420 A | 8/1997 | Wakai et al. | |
| 5,724,122 A * | 3/1998 | Oskotsky | 355/67 |

(Continued)

FOREIGN PATENT DOCUMENTS

EP      1548481      6/2005

(Continued)

OTHER PUBLICATIONS

Ng et al."Light Field Photography with a Hand-Held Plenoptic Camera", Apr. 2005, Stanford Tech Report CTSR Feb. 2005, pp. 1-11.*

(Continued)

*Primary Examiner* — Christopher Mahoney
*Assistant Examiner* — Linda B Smith
(74) *Attorney, Agent, or Firm* — Robert C. Kowert; Meyertons, Hood, Kivlin, Kowert & Goetzel, P.C.

(57) ABSTRACT

Methods and apparatus for light-field imaging. Light-field camera designs are described that produce higher spatial resolution than conventional plenoptic camera designs, while trading-off the light-field's angular sampling density. This lower angular resolution may be compensated for by a light-field image processing method that inserts data synthesized by view interpolation of the measured light-field. In one embodiment, a light-field image processing method that performs three-view morphing may be used to interpolate the missing angular samples of radiance. The light-field camera designs may be implemented in hand-held light-field cameras that may capture a light-field with a single exposure. Some of the light-field camera designs are internal to the camera, while others are external to the camera. One light-field camera design includes a single, relatively large lens and an array of negative lenses that are placed in front of (external to) the main lens of a conventional camera.

31 Claims, 14 Drawing Sheets

U.S. PATENT DOCUMENTS

| | | | |
|---|---|---|---|
| 5,729,011 A * | 3/1998 | Sekiguchi | 250/226 |
| 5,946,077 A | 8/1999 | Nemirovskiy | |
| 6,097,394 A | 8/2000 | Levoy et al. | |
| 6,097,541 A * | 8/2000 | Davies et al. | 359/619 |
| 6,137,535 A * | 10/2000 | Meyers | 348/340 |
| 6,137,937 A | 10/2000 | Okano et al. | |
| 6,268,846 B1 | 7/2001 | Georgiev | |
| 6,301,416 B1 | 10/2001 | Okano et al. | |
| 6,339,506 B1 | 1/2002 | Wakelin et al. | |
| 6,351,269 B1 | 2/2002 | Georgiev | |
| 6,476,805 B1 | 11/2002 | Shum et al. | |
| 6,738,533 B1 | 5/2004 | Shum et al. | |
| 6,838,650 B1 | 1/2005 | Toh | |
| 7,019,671 B2 * | 3/2006 | Kawai | 340/937 |
| 7,054,067 B2 | 5/2006 | Okano et al. | |
| 7,085,062 B2 * | 8/2006 | Hauschild | 359/626 |
| 7,620,309 B2 | 11/2009 | Georgiev | |
| 7,732,744 B2 * | 6/2010 | Utagawa | 250/208.1 |
| 7,792,423 B2 | 9/2010 | Raskar et al. | |
| 7,880,794 B2 * | 2/2011 | Yamagata et al. | 348/335 |
| 7,962,033 B2 | 6/2011 | Georgiev et al. | |
| 8,019,215 B2 | 9/2011 | Georgiev et al. | |
| 2001/0012149 A1 | 8/2001 | Lin et al. | |
| 2001/0050813 A1 | 12/2001 | Allio | |
| 2002/0140835 A1 | 10/2002 | Silverstein | |
| 2003/0108821 A1 * | 6/2003 | Mei et al. | 430/321 |
| 2003/0231255 A1 | 12/2003 | Szajewski et al. | |
| 2004/0114807 A1 | 6/2004 | Lelescu et al. | |
| 2004/0223214 A1 | 11/2004 | Atkinson | |
| 2005/0088714 A1 | 4/2005 | Kremen | |
| 2005/0122418 A1 | 6/2005 | Okita et al. | |
| 2006/0104542 A1 | 5/2006 | Blake et al. | |
| 2007/0091197 A1 * | 4/2007 | Okayama et al. | 348/340 |
| 2007/0252074 A1 | 11/2007 | Ng et al. | |
| 2008/0056549 A1 | 3/2008 | Hamill et al. | |
| 2008/0107231 A1 | 5/2008 | Miyazaki et al. | |
| 2008/0152215 A1 * | 6/2008 | Horie et al. | 382/154 |
| 2008/0165270 A1 | 7/2008 | Watanabe et al. | |
| 2008/0166063 A1 | 7/2008 | Zeng | |
| 2008/0187305 A1 | 8/2008 | Raskar et al. | |
| 2008/0193026 A1 * | 8/2008 | Horie et al. | 382/238 |
| 2008/0218610 A1 | 9/2008 | Chapman et al. | |
| 2008/0247623 A1 | 10/2008 | Delso et al. | |
| 2009/0041381 A1 | 2/2009 | Georgiev | |
| 2009/0041448 A1 | 2/2009 | Georgiev | |
| 2009/0086304 A1 | 4/2009 | Yurlov et al. | |
| 2009/0140131 A1 | 6/2009 | Utagawa | |
| 2009/0185801 A1 | 7/2009 | Georgiev et al. | |
| 2009/0295829 A1 | 12/2009 | Georgiev et al. | |
| 2010/0026852 A1 * | 2/2010 | Ng et al. | 348/239 |
| 2010/0085468 A1 | 4/2010 | Park et al. | |
| 2010/0205388 A1 | 8/2010 | MacInnis | |
| 2010/0265386 A1 | 10/2010 | Raskar et al. | |

FOREIGN PATENT DOCUMENTS

| | | |
|---|---|---|
| JP | 7270791 | 10/1995 |
| JP | 2001330769 | 11/2001 |
| JP | 2004239932 | 8/2004 |
| WO | 01/37025 | 5/2001 |
| WO | 2006/057838 | 6/2006 |
| WO | 2007/115281 | 10/2007 |

OTHER PUBLICATIONS

Adelson T., Wang J.: "Single Lens Stereo with a Plenoptic Camera," IEEE Transactions on Pattern Analysis and Machine Intelligence (1992), 99-106.

Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.

Gortler S. J., Grzeszczuk R., Szeliski, R., Cohen M. F.: "The Lumigraph," ACM Trans. Graph. (1996), 43-54.

Georgiev T., Wainer M.: "Morphing Between Multiple Images," Tech. Rep. (1997).

Isaksen A., McMillan L., Gortler S. J.: "Dynamically Reparameterized Light Fields," ACM Trans. Graph. (2000), 297-306.

Levoy M., Hanrahan P.: "Light Field Rendering," ACM Trans. Graph. (1996), 31-42.

Lippmann G.: "Epreuves reversible donnant la sensation du relief ("Reversible Prints Providing the Sensation of Depth")", Journal of Physics 7 (1908), pp. 821-825.

Lippmann G.: "Epreuves Reversibles Photographies Integrales," Academie des sciences (Mar. 1908), pp. 446-451.

Lee S., Wolberg G., Shin S.: "Polymorph: Morphing Among Multiple Images," IEEE Computer Graphics and Applications (1998).

Ng R., Levoy M., Brledif M., Duval G., Horowitz M., Hanrahan P.: "Light Field Photography with a Hand-held Plenoptic Camera," Tech. Rep. (2005).

Ng R.: "Fourier Slice Photography," Proceedings of ACM SIGGRAPH 2005 (Jan. 2005).

Naemura T., Yoshida T., Harashima H.: "3d Computer Graphics Based on Integral Photography," Optics Express, vol. 8,2 (2001).

Zitnick C. L., Jojic N., Kang S.: "Consistent Segmentation for Optical Flow Estimation" In Proceedings of IEEE International Conference on Computer Vision (ICCV) (2005).

Seitz S. M., Dyer C. R.: "View Morphing," ACM Trans. Graph. (1996), 21-30.

Stevens R., Harvey T.: "Lens Arrays for a Three-dimensional Imaging System," Journal of Optics A, vol. 4 (2002).

Stewart J., Yu J., Gortler S. J., McMillan L.: "A New Reconstruction Filter for Undersampled Light Field," Eurographics Symposium on Rendering (2003), 150-156.

Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).

Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005).

Xiao J., Shah M.: "Tri-view Morphing," Computer Vision and Image Understanding 96, 3 (2004), 345-366.

Park, S., Park, M., and Kang, M., "Super-resolution image reconstruction: a technical overview," Signal Processing Magazine, 2003, 16 pages.

David E. Roberts, History of Lenticular and Related Autostereoscopic Methods, 2003, 17 pages.

Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

Lumsdaine A., Georgiev T.: Full Resolution Lightfield Rendering. Tech. rep., Adobe Systems, Jan. 2008, 12 pages.

Baker S., Kanade T.: Limits on superresolution and how to break them. IEEE Transactions on Pattern Analysis and Machine Intelligence (Jan. 2002), 377 pages.

Bishop T. E., Zanetti S., Favaro P.: Light field superresolution. In International Conference on Computational Photography (Apr. 16-17, 2009), 4 pages.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

Lin Z., Shum H.: Fundamental limits of reconstruction-based superresolution algorithms under local translation. IEEE Transactions on Pattern Analysis and Machine Intelligence 26, 1 (Jan. 2004), 83-97.

Ng M. K., Bose N. K.: Mathematical analysis of super-resolution methodology. Signal Processing Magazine, IEEE 20, 3 (2003), 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Lumsdaine A., Georgiev T.: The focused plenoptic camera. In International Conference on Computational Photography (Apr. 2009), 8 pages.

Georgiev T., Lumsdaine A.: Depth of field in plenoptic cameras. In Eurographics 2009—Annex (Apr. 2009), pp. 5-8.

Levoy, et al. "Recording and controlling the 4D light field in a microscope using microlens arrays", Journal of Microscopy, 2009, 19 pages.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.

Levoy, Mark et al., "Light Field Microscopy," Stanford University, Submitted to Siggraph 2006, 5 pages.

Levoy, Mark, "Optical Recipes for Light Microscopes," Stanford Computer Grpahics Laboratory Technical Memo 2006-001, Jun. 20, 2006, 10 pages.

Georgeiv, et al. "Spatio-Angular Resolution Tradeoff in Integral Photography," Proc. EGSR, 2006, 10 pages.

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

Farsiu, S., Robinson, D., Elad, M., and Milanfar, P., "Advances and challenges in super-resolution," International Journal of Imaging Systems and Technology, 2004, 12 pages.

Elad, M., and Feuer, A., "Restoration of a single superresolution image from several blurred, noisy, and undersampled measured images," IEEE Transactions on Image Processing Dec. 1997, pp. 1646-1658.

Borman, S., and Stevenson, R., "Super-resolution from image sequences—a review", Proceedings of the 1998 Midwest Symposium on Circuits and Systems, Publication Date: Aug. 9-12, 1998, on pp. 374-378.

Sebe, et al., "Mutli-View Geometry Estimation for Light Field Compression," VMV 2002, 8 pages.

Chang, et al., "Light Field Compression Using Disparity-Compensated Lifting and Shape Adaptation," IEEE Transactions on Image Processing, vol. 15, No. 4, Apr. 2006, pp. 793-806.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

J. Neumann, et al., "Eyes from Eyes Analysis of Camera Design Using Plenoptic Video Geometry," Dec. 2001, 20 pages, XP002509893.

Todor Georgiev and Chintan Intwala: "Light Field Camera Design for Integral View Photography," Adobe Tech. Rep., 2006, 13 pages.

F. Durand, N. Holzschuch, C. Soler, E. Chan, and F. Sillion: "A frequency Analysis of Light Transport," ACM Trans. Graph., pp. 1115-1126, 2005.

J. Chai, S. Chan, H. Shum, and X. Tong: "Plenoptic Sampling", ACM Trans. Graph., pp. 307-318, 2000.

U.S. Appl. No. 12/574,183, filed Oct. 6, 2009.
U.S. Appl. No. 11/627,141, filed Jan. 25, 2007.
U.S. Appl. No. 12/186,396, filed Jun. 23, 2008.
U.S. Appl. No. 11/874,611, filed Oct. 18, 2007.
U.S. Appl. No. 12/111,735, filed Apr. 29, 2008.
U.S. Appl. No. 12/271,389, filed Nov. 14, 2008.
U.S. Appl. No. 12/474,112, filed May 28, 2009.
U.S. Appl. No. 12/130,725, filed May 30, 2008.
U.S. Appl. No. 12/636,168, filed Dec. 11, 2009.
U.S. Appl. No. 12/690,569, filed Jan. 20, 2010.
U.S. Appl. No. 12/690,871, filed Jan. 20, 2010.
U.S. Appl. No. 12/503,803, filed Jul. 15, 2009.
U.S. Appl. No. 12/628,437, filed Dec. 1, 2009.
U.S. Appl. No. 12/790,677, filed May 28, 2010.

Yang, J C, et al., "A Real-Time Distributed Light Field Camera," Rendering Techniques 2002, Eurographics Workshop Proceedings, PIS, Italy, Jun. 26-28, 2002, 9 pages.

Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, 12 pages, XP002491494.

M. Levoy, "Light Fields and computational Imaging," Computer [Online], vol. 39, No. 8, Aug. 2006, pp. 46-55, XP002501300.

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

Georgiev, et al. "Light-Field Capture by Multiplexing in the Frequency Domain," ADOBE Technical Report, Apr. 2007, all pages.

JP504669 (1975), all pages, english equivalent is U.S. Patent 3985419, dated Oct. 12, 1976 by Matsumoto, et al.

* cited by examiner

METHODS AND APPARATUS FOR LIGHT-FIELD IMAGING

PRIORITY INFORMATION

This application claims benefit of priority of U.S. Provisional Application Ser. No. 60/946,018 entitled "Spatio-Angular Resolution Tradeoff in Integral Photography" filed Jun. 25, 2007, the content of which is incorporated by reference herein in its entirety.

BACKGROUND

Description of the Related Art

The light-field or radiance density function is a complete representation of light energy flowing along "all rays" in 3D space. This density is a field defined in the 4D domain of the optical phase space, the space of all lines in 3D with symplectic structure.

Conventional cameras fail to capture a large amount of optical information. In particular, a conventional camera does not capture information about the location on the aperture where different light rays enter the camera. During operation, a conventional digital camera captures a two-dimensional (2-D) image representing a total amount of light that strikes each point on a photosensor within the camera. However, this 2-D image contains no information about the directional distribution of the light that strikes the photosensor. Directional information at the pixels corresponds to locational information at the aperture.

Conventional cameras, based on 2D image sensors, are simply integration devices. In a typical setting, they integrate over a 2D aperture to produce a 2D projection of the full 4D light-field density. Integral photography attempts to "undo" the integration and measure the complete 4D light-field arriving at all points on a film plane or sensor. Capturing the additional two dimensions of radiance data allows re-sorting the rays of light to synthesize new photographs, which may be referred to as novel views. Light-field rendering may simulate a realistic camera with a finite aperture, producing depth of field effects. In this way, synthetic-aperture photography may compute photographs focused at different depths from a single light-field by simple numerical integration over the desired aperture.

Light-field cameras sample the four-dimensional (4-D) optical phase space or light-field and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

The earliest works in integral photography used arrays of lenslets or pinholes placed directly in front of film, creating multiple images on the film like an array of cameras. Optically similar to that is a physical array of digital cameras, which is a primary approach used in current light-field research (see FIG. 1A, described below). A related type of integral photography design places an array of positive lenses in front of a conventional camera to create an array of real images between the lenses and the camera. Then the camera takes a picture focused on those images.

Light-fields may be captured with a conventional camera. In one conventional method, M×N images of a scene are captured from different positions with a conventional camera. If, for example, 8×8 images are captured from 64 different positions, 64 images are produced. The pixel from each position (i,j) in each image are taken and placed into blocks, to generate 64 blocks.

FIG. 1A illustrates an exemplary conventional light-field camera array, which employs an array of cameras. Each objective lens focuses on a separate photosensor 108. This light-field camera 100 is a combination of two or more conventional cameras that each simultaneously records an image of a subject on a particular photosensor 108. The captured images may then be combined to form one image.

A full 4D light-field may be captured with a conventional hand-held plenoptic camera. This approach may make light-field photography more practical, giving the photographer the freedom and the power to make adjustments of focus and aperture after the picture has been taken. In a way, it transfers the optics of the lens of the camera into the digital domain, extending the types of post-processing possible with software like Adobe® Photoshop®.

Plenoptic cameras effectively place a big (main, or objective) lens in front of an array of lenslets (or cameras), forming an image on the array of lenslets. In conventional plenoptic cameras, the array of lenslets or microlenses (or other optical elements, such as pinholes) is fixed at a small distance (~0.5 mm) from a photosensor, e.g. a charge-coupled device (CCD). Conventionally, the microlenses are placed and adjusted accurately to be exactly at one focal length f from the sensor, where f is the focal length of the microlenses in the array. Each microlens creates an image sampling the angular distribution of radiance at that point, which corresponds to one single direction observed from multiple points of view on the main lens aperture. Thus, the raw image captured with a conventional plenoptic camera is made up of an array of small images, typically circular, of the main lens. The conventional plenoptic camera approach swaps the placement of spatial and angular samples on the image plane: instead of producing an array of ordinary images, as in integral photography, it creates what appears as a single, recognizable "image" consisting of small 2D arrays of angular samples of a single point in the scene.

FIG. 1B illustrates an exemplary conventional plenoptic camera, another type of light-field camera, that employs a single objective lens and a microlens or lenslet array 106 that includes, for example, about 100,000 lenslets. Lenslet array 106 is typically placed a small distance (~0.5 mm) from a photosensor 108, e.g. a charge-coupled device (CCD). The raw image captured with a plenoptic camera 102 is made up of an array of small images, typically circular, of the main camera lens 108. These small images may be referred to as microimages. The lenslet array 106 enables the plenoptic camera 102 to capture the light-field, i.e. to record not only image intensity, but also the distribution of intensity in different directions at each point. Each lenslet splits a beam coming to it from the main lens 104 into rays coming from different "pinhole" locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. Each macropixel contains different angular samples of the light rays coming to a given microlens. Each macropixel contributes to only one pixel in the different angular views of the scene. As a result, each angular view contains 100,000 pixels.

Another conventional type of integral or light-field camera is similar to the plenoptic camera of FIG. 1B, except that an array of pinholes are used between the main lens and the photosensor instead of an array of lenslets. Yet another type of conventional integral or light-field camera is similar to the plenoptic camera of FIG. 1B, except that a non-refractive mask is used between the main lens and the photosensor instead of an array of lenslets. The mask is a non-refractive element, and attenuates the incoming rays but does not bend them. The captured image is the convolution of the incoming light-field with the mask light-field.

Conventional plenoptic cameras such as camera 102 of FIG. 1B require a large number of samples of the radiance. With such a design, even with a 16-megapixel image sensor, the spatial resolution of the sampled light-field is limited, for example to 300×300 pixels.

In an exemplary conventional plenoptic camera 102 of the type illustrated in FIG. 1B, the light-field may be captured by an array of 2962 lenslets inside a conventional camera. Each lenslet in this example corresponds to a little camera producing an approximately 14×14 pixel image of the main lens aperture. Each pixel within that small image corresponds to one viewpoint on the aperture, while different lenslets correspond to different pixels in the final image. The result is an approximately 100-view light-field with 90,000 pixels per view. (The number of effective views is 100 instead of 142 due to losses, which will be discussed later.)

Unfortunately, from the standpoint of professional photographers, this system produces images with very low spatial resolution. One way to remedy this problem would be to use more lenslets (for example, 1,000,000 lenslets, e.g. in a 1000× 1000 array), with fewer views/pixels under each lenslet (for example, 16). The difficulty with such a remedy is that each small image of the main lens aperture created by a lenslet includes pixels at the aperture boundary that are either lost entirely, or noisy. Such boundary pixels are only partially covered by the image of the aperture. In order to reconstruct the true irradiance corresponding to the illuminated part of each pixel, one would need to know exactly what percentage of it has been illuminated, and correct for that in software. In other words, very precise calibration of all pixels in the camera would be needed. However, captured pixel values may be affected by tiny misalignments, such as pixel shift due to thermal expansion of the image sensor. A misalignment of a micrometer may change a boundary pixel value by, e.g., more than 10%. This problem gets very visible when the lenslets get smaller. In the limiting case of a 2×2 or 4×4 pixel image under each lenslet (depending on Bayer array), all the pixels become boundary pixels, providing no reliable 3D information at all.

Optical Elements

A lens is a transparent optical element consisting of one or more pieces of optical glass with surfaces so curved (usually spherical) that they serve to converge or diverge the transmitted rays from an object, thus forming a real or virtual image of that object. A negative lens is a lens that causes parallel light rays to spread out. A negative lens may also be referred to as a divergent lens, concave lens or dispersive lens. The lens surfaces of a negative lens may be plano-concave, double concave or concavo-convex. A positive lens is a lens that converges an incident bundle of rays to a focus. A positive lens may also be referred to as a converging lens, a convergent lens, or a convex lens. A prism is a transparent optical element having at least two polished plane faces inclined relative to each other, from which light is reflected or through which light is refracted.

SUMMARY

Various embodiments of methods and apparatus for integral or light-field imaging are described. Several embodiments of integral or light-field camera designs are described that produce higher spatial resolution than conventional plenoptic camera designs, while trading-off the light-field's angular sampling density. However, in embodiments, this lower angular resolution in the input may be compensated for by a light-field image processing method that inserts data synthesized by view interpolation of the measured light-field. In one embodiment, a light-field image processing method that performs three-view morphing may be used to interpolate the missing angular samples of radiance. Such interpolated light-fields generated from sparsely sampled radiance are generally good enough to produce synthetic aperture effects, new view synthesis, and refocusing with minimal loss in quality.

Embodiments of light-field camera designs described herein may be implemented in hand-held light-field cameras that may capture a light-field with a single exposure. This adds a whole new dimension to digital photography with the ability to capture a sparse light-field with higher spatial resolution with a compact camera design, and the application of later post-processing based on computer vision to compensate for the lower angular resolution. Some of the light-field camera designs are internal to the camera (i.e., incorporating additional optical elements between the main or objective lens of the camera and the camera photosensor), while others are external to the camera (i.e., incorporating additional optical elements in front of the main or objective lens of the camera, coupled externally to the camera for example in an attachment or tube).

In one embodiment, a light-field camera design includes a lens array of multiple relatively smaller lenses instead of or as a replacement for a single larger main or objective lens as in conventional cameras. Unlike conventional light-field cameras, a light-field camera implemented according to this design is a single camera rather than an array of distinct and separate cameras.

In one embodiment, a light-field camera design incorporates an array of multiple prisms internal to the camera and proximate to the main or objective lens. The prisms in the array each act to tilt rays from the main lens onto a corresponding region of the photosensor.

In one embodiment, a light-field camera design incorporates an array of multiple positive lenses internal to the camera and proximate to the main or objective lens. The positive lenses act to move the image plane forward, or closer to the main lens than the original location of the image plane of the main lens. The positive lenses in the array each act to shift rays from the main lens onto a corresponding region of the photosensor.

In one embodiment, a light-field camera design incorporates an array of multiple negative lenses internal to the camera and proximate to the main or objective lens. The negative lenses act to move the image plane backward, or further away from the main lens than the original location of the image plane of the main lens. The negative lenses in the array each act to shift rays from the main lens onto a corresponding region of the photosensor.

In one embodiment, a light-field camera design includes multiple optical elements that are placed in front of (external to) the main lens of a conventional camera. The optical elements include a single, relatively large lens, arranged in front of an array of negative lenses. The single lens and the array of negative lenses may be assembled in a tube or attachment, which may attach to the conventional camera via any standard, or optionally by custom, camera lens attachment mechanisms.

Figure 1A:
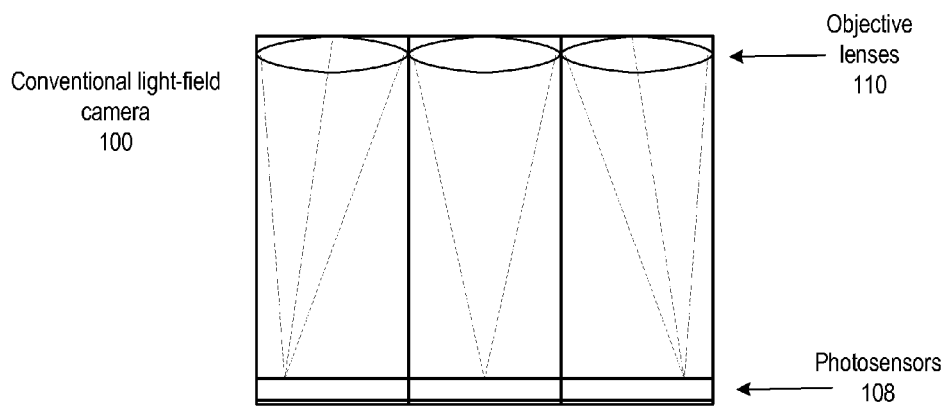
FIG. 1A illustrates an exemplary conventional light-field camera array.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of methods and apparatus for integral or light-field imaging are described. In embodiments, integral or light-field photography may be approached from the perspective of radiance analysis in geometrical optics. This provides a new way of looking at integral photography and the associated light-field rendering. Several embodiments of integral or light-field camera designs are provided that produce higher spatial resolution than conventional plenoptic camera designs such as camera 102 of FIG. 1B, while trading-off the light-field's angular sampling density. However, in embodiments, this lower angular resolution in the input may be compensated for by inserting data synthesized by view interpolation of the measured light-field. In one embodiment, three-view morphing may be used to interpolate the missing angular samples of radiance. Such interpolated light-fields generated from sparsely sampled radiance are generally good enough to produce synthetic aperture effects, new view synthesis, and refocusing with minimal loss in quality.

Several practical light-field camera designs, and embodiments of light-field cameras based on those designs, are described with a specific application to synthetic aperture photography. Two fundamental ways of approaching light-field capture are compared. Embodiments may employ a sparse sampling of the angular dimensions of the light-field in order to achieve better spatial resolution. As such, various embodiments of light-field cameras as described herein may be used to produce results with higher spatial resolution than conventional plenoptic cameras, using the same image sensor.

In embodiments, computer vision techniques may be used as a post-processing tool to interpolate or "fill in" the sparse light-field. The effectiveness of this framework is demonstrated with realistic refocusing and depth of field results, according to one embodiment. Averaging multiple intermediate views not only reduces sampling errors, but also makes errors caused by stereo matching much more tolerable, according to one embodiment.

Embodiments of light-field camera designs described herein may be implemented in hand-held light-field cameras that may capture a light-field with a single exposure. This adds a whole new dimension to digital photography with the ability to capture a sparse light-field with higher spatial resolution with a compact camera design, and the application of later post-processing based on computer vision to compensate for the lower angular resolution.

One embodiment of an integral camera uses a system of lenses and/or prisms as an external optical attachment to a conventional camera. In one embodiment, using a computer-vision based view interpolation algorithm, an embodiment of the integral camera may be used to adjust the depth of field and novel views for scenes with high-speed action may be synthesized, which are impossible to do with conventional cameras. Moreover, with the same 16-megapixel sensor used with conventional plenoptic cameras such as camera 102 of FIG. 1B, some embodiments may achieve a much higher spatial resolution, for example 700×700 pixels, in the computed images. Note that a 16-megapixel sensor is used by way of example; N-megapixel sensors may be used in embodiments. The general point is that embodiments of the integral camera designs described herein may achieve higher spatial resolution with similar sensors when compared to conventional integral camera designs.

Figure 1B:
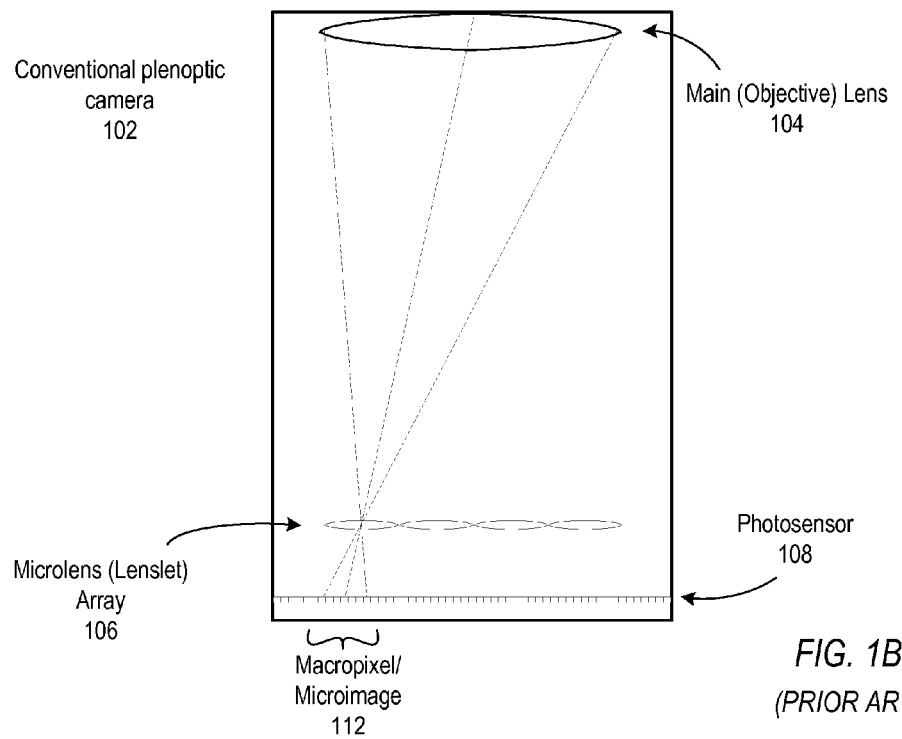
FIG. 1B illustrates an exemplary conventional plenoptic camera.

Various types of conventional light-field cameras, such as those illustrated by light-field camera 100 of FIG. 1A and plenoptic camera 102 of FIG. 1B, share a goal—that of increasing angular resolution of the measured light-field, which often comes at the cost of spatial resolution of the final 2D images that are generated. However, embodiments described herein may employ the trade-off between angular and spatial resolution, and show that for typical scenes it may be advantageous to use higher spatial resolution at the cost of angular resolution.

Capturing 4D Radiance with a 2D Sensor

Figure 2A:
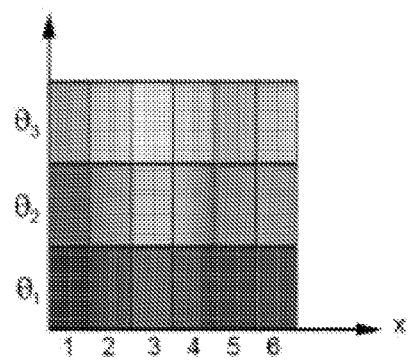
FIG. 2A illustrates partitioning optical phase space into sampling regions for a light-field camera.
Figure 2B:
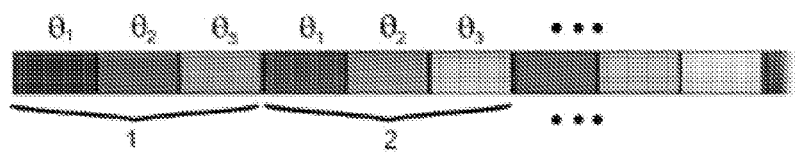
FIG. 2B illustrates the "plenoptic" way of sampling.
Figure 2C:
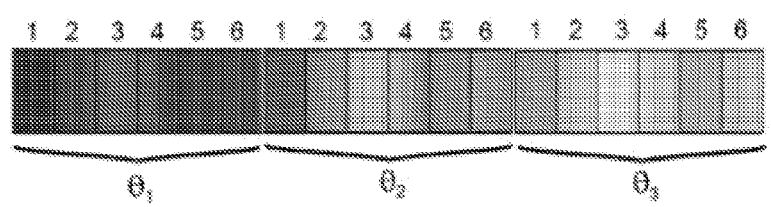
FIG. 2C illustrates the "integral photography" way of sampling.

For visualization purposes, suppose that optical phase space (a.k.a. "light-field space") were 2-dimensional (instead of 4D), with one spatial dimension x, and one angular dimension θ. Possible designs for a 1D image detector are shown in FIGS. 2A through 2C. FIG. 2A illustrates partitioning optical phase space (x, θ) into sampling regions for the light-field camera. FIG. 2B illustrates the "plenoptic" way of sampling.

FIG. 2C illustrates the "integral photography" way of sampling.

It may be desirable to sample most densely the dimension that changes the most—i.e., the spatial rather than angular dimension. Adopting this space-saving approach leads to partitioning of the light space into rectangles or radiance pixels, "long" in the direction of θ, and "short" in the direction of x (see FIG. 2A). Radiance pixels are relatively sparse (e.g., three samples) along the angular direction, but relatively dense (e.g., six samples) along the spatial direction. This is the type of partitioning of optical phase space practically chosen in most light-field cameras.

In order to fit the 2D phase space of FIG. 2A into a single dimension, light-field data may be rearranged, or multiplexed, to fit into a single row, as a 1D array. The "plenoptic camera arrangement" illustrated in FIG. 2B puts all angular samples for pixel 1 (the first column in FIG. 2A) in a row, then all angular samples for pixel 2 (the second column in FIG. 2A) next to them, and so on. The problem at the boundaries discussed above is encountered. Out of three angular samples, only one is left intact. The left and right pixels in each sub-image, $\theta_1$ and $\theta_3$, are lost.

To avoid this problem the optical data may be rearranged as in FIG. 2C. All spatial samples at a given angle θ are grouped together. In this way a coherent image of lots of pixels representing $\theta_1$-samples is achieved, then next to them all $\theta_2$ samples are placed, and so on. Again boundary pixels are lost, but now the lost boundary pixels are much fewer as a percentage of all pixels in a subimage.

Derivation of Camera Design for Some Embodiments

In a traditional approach to light-field photography, an array of cameras would be used to capture an array of 2D images as illustrated in FIG. 2C. For example, a conventional arrangement of lenses from integral photography, shown in FIG. 1B, produces just such a result. A series of equivalent camera designs may be based on a formula from affine optics, as shown below. The affine optics treatment of optical phase space may be used in other light-field constructions.

Figure 3:
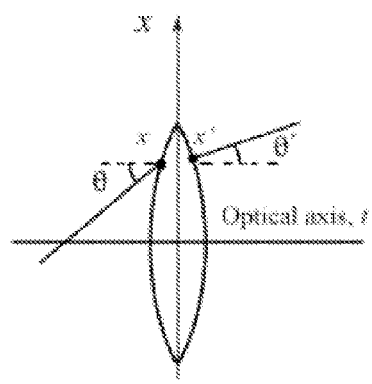
FIG. 3 illustrates light-field transformation at the plane of a lens.

Conventional Gaussian optics is linear in the following sense. All the equations are written relative to the optical axis, which plays the role of origin (or zero point) in optical phase space ("light-field space"), treated as a vector space (see FIG. 3). FIG. 3 illustrates light-field transformation at the plane of a lens. The following discussion is applied in a 2D optical phase space, with spatial dimension x and angular dimension θ. More precisely, θ is used to denote the tangent of the angle relative to the optical axis, at which a ray intersects a plane (line in this case) perpendicular to the optical axis. Finally, let f donate focal length.

With this notation, a lens may be defined by the linear transform:

$$\begin{pmatrix} x' \\ \theta' \end{pmatrix} = \begin{pmatrix} 1 & 0 \\ -\frac{1}{f} & 1 \end{pmatrix} \begin{pmatrix} x \\ \theta \end{pmatrix}. \quad (1)$$

A space translation of the light-field from one plane to another separated by distance T may be represented by the linear transform:

$$\begin{pmatrix} x' \\ \theta' \end{pmatrix} = \begin{pmatrix} 1 & T \\ 0 & 1 \end{pmatrix} \begin{pmatrix} x \\ \theta \end{pmatrix}. \quad (2)$$

These and all other transforms used in Gaussian optics are linear transforms relative to the optical axis. Unfortunately, in linear optics there is no representation for a lens shifted from the optical axis, as is needed in light-field photography. For example, referring to the exemplary light-field camera in FIG. 5A, an arbitrary optical axis through one of the lenses may be chosen, and then all of the other lenses may be considered shifted relative to the arbitrary optical axis, and not representable as linear transforms in this coordinate system. In conventional linear optics, there is no way of writing an expression for the radiance valid at the same time everywhere in a light-field camera.

To derive a rigorous description of this new situation, a more general mathematical framework is needed that extends linear optics into what may be referred to as affine optics (as it adds translations to linear optics). A typical element representing an affine transform would be the prism. A prism shifts or tilts all rays by the same fixed angle α that depends only on the prism itself. Expressed in terms of the ray coordinates, the prism transform is:

$$\begin{pmatrix} x' \\ \theta' \end{pmatrix} = \begin{pmatrix} x \\ \theta \end{pmatrix} + \begin{pmatrix} 0 \\ \alpha \end{pmatrix}. \quad (3)$$

A lens shifted a distance s from the optical axis may be treated as follows:

Convert to new lens-centered coordinates by subtracting s:

$$\begin{pmatrix} x' \\ \theta' \end{pmatrix} = \begin{pmatrix} x \\ \theta \end{pmatrix} - \begin{pmatrix} s \\ 0 \end{pmatrix} \quad (4)$$

Apply the usual linear lens transform:

$$\begin{pmatrix} x'' \\ \theta'' \end{pmatrix} = \begin{pmatrix} 1 & 0 \\ -\frac{1}{f} & 1 \end{pmatrix} \begin{pmatrix} x-s \\ \theta \end{pmatrix} \quad (5)$$

3. Convert to the original optical axis coordinates by adding back s:

$$\begin{pmatrix} q''' \\ \theta''' \end{pmatrix} = \begin{pmatrix} 1 & 0 \\ -\frac{1}{f} & 1 \end{pmatrix} \begin{pmatrix} x-s \\ \theta \end{pmatrix} + \begin{pmatrix} s \\ 0 \end{pmatrix} \quad (6)$$

This equation (equation 6) may be rewritten as:

$$\begin{pmatrix} q''' \\ \theta''' \end{pmatrix} = \begin{pmatrix} 1 & 0 \\ -\frac{1}{f} & 1 \end{pmatrix} \begin{pmatrix} x \\ \theta \end{pmatrix} + \begin{pmatrix} 0 \\ \frac{s}{f} \end{pmatrix}. \quad (7)$$

Thus, a shifted lens is equivalent to a lens with a prism. This result will be used to show that light-field or integral camera designs according to various embodiments, as illustrated in FIG. 4 and FIGS. 5A through 5E, may be optically equivalent to arrays of cameras. This equivalence may be exact.

FIG. 4 and FIGS. 5A through 5E illustrate various designs of integral or light-field cameras according to embodiments. Some of the illustrated designs are internal to the camera (i.e., incorporating additional optical elements between the main, or objective, lens of the camera and the camera's photosensor), while others are external to the camera (i.e., incorporating additional optical elements in front of the main, or objective, lens of the camera, configured to be coupled externally to the camera for example in an attachment or tube).

Figure 4:
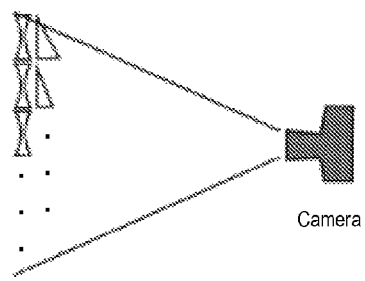
FIG. 4 shows an external light-field camera design that uses arrays of negative lenses and prisms placed between the object field and the main lens of the camera, according to one embodiment.
Figure 15:
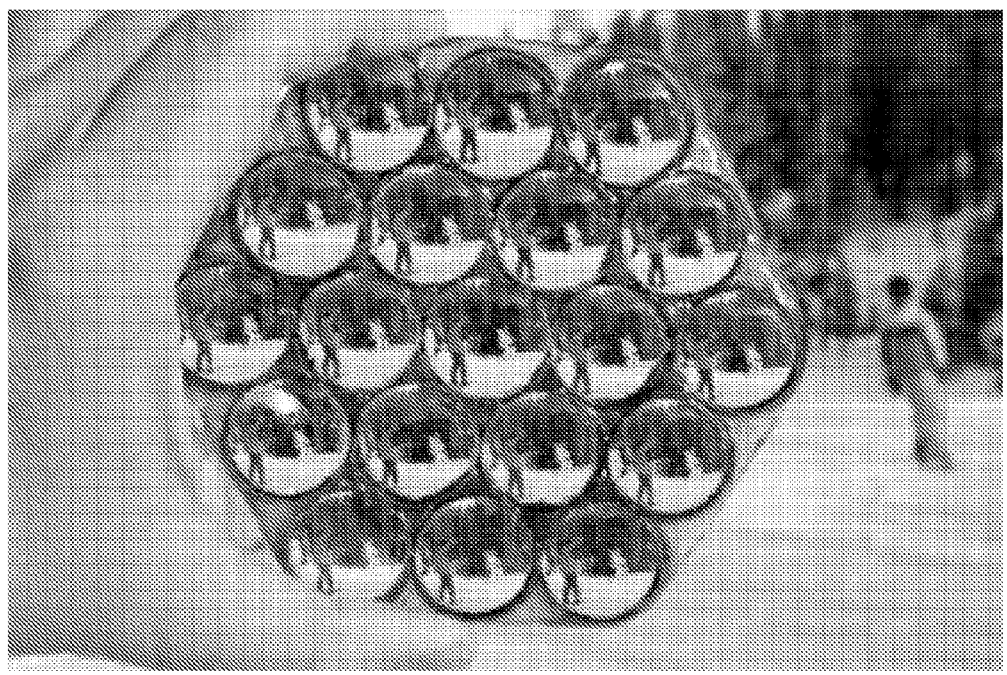
FIG. 15 shows an exemplary optical device consisting of an array of 19 negative lenses in front of an array of 18 prisms, as may be used in a light-field camera as illustrated in FIG. 4.

FIG. 4 illustrates an external design that uses arrays of negative lenses and prisms that has no analog as an internal design. Embodiments of a plenoptic camera design similar to the design illustrated in FIG. 4 are described in U.S. Patent Application 2007/0230944, entitled Plenoptic Camera, filed Apr. 4, 2006, whose inventor is Todor G. Georgiev, the content of which is incorporated by reference herein in its entirety. An exemplary embodiment of the design of FIG. 4 has been implemented in a version made up of 19 lenses and 18 prisms, as described in U.S. Patent Application 2007/0230944. FIG. 15 shows an exemplary optical device consisting of an array of 19 negative lenses in front of an array of 18 prisms. The embodiment of FIG. 4 may be relatively light-weight compared to a similar design with a single large lens and an array of smaller lenses, as illustrated in FIG. 5E. In addition, an array of prisms may be less expensive than a single large lens.

As in the design illustrated in FIG. 5E, the camera in FIG. 4 sees an array of virtual images created by the negative lenses in front of the optical device and focuses upon them. The prisms shift these images appropriately, so the result is as if the scene is viewed by an array of parallel cameras. Again the idea is that a camera with a lens shifted from the optical axis is equivalent to a camera on the axis, a lens and a prism. It should also be noted that practically, the role of the negative lenses is to expand the field of view in each image, and that the prisms can be viewed as making up a Fresnel lens focused at the camera's center of projection. Other external designs are possible with an array of positive lenses creating real images between the array of lenses and the main camera lens.

FIGS. 5A through 5E illustrate five novel light-field camera designs according to embodiments. FIGS. 5A through 5D illustrate various internal designs, and FIG. 5E illustrates an external design.

Figure 5A:
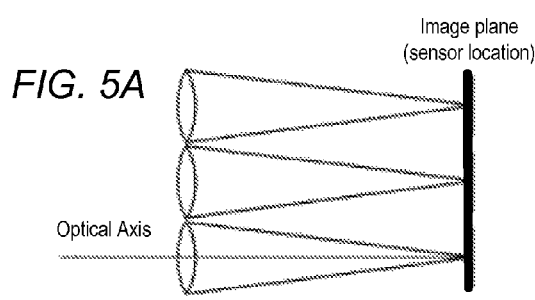
FIG. 5A illustrates a light-field camera design embodiment in which the single objective lens of a camera is replaced by an array of N lenses.

FIG. 5A illustrates a light-field camera design embodiment that appears somewhat similar to a conventional light-field camera as illustrated in FIG. 1A. However, in this embodiment, rather than arranging an array of individual cameras, the single objective lens of a single camera is replaced by an array of N lenses, and N images from the N lenses may be captured on N regions of the camera's photosensor. In the illustrated embodiment, the lenses are shown as positive lenses; in an alternative embodiment, the lenses may be negative lenses.

Figure 5B:
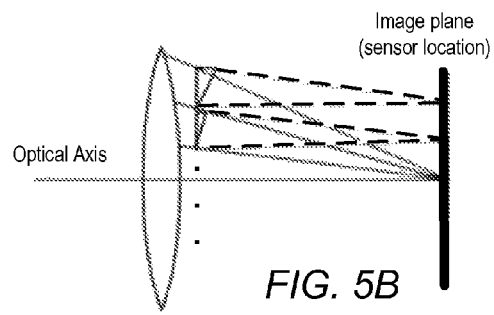
FIG. 5B illustrates a light-field camera design embodiment that incorporates an array of multiple prisms internal to the camera and proximate to the main or objective lens.

FIG. 5B illustrates a light-field camera design embodiment that incorporates an array of multiple prisms internal to the camera and proximate to the main or objective lens. (In contrast, the array of microlenses in a conventional plenoptic camera as illustrated in FIG. 1B is proximate to the photosensor.) The prisms in the array each act to refract or tilt rays from the main lens onto a corresponding region of the photosensor, as indicated by the dashed lines. N+1 images shifted by the N prisms are captured on N+1 regions of the camera's photosensor. Note that N prisms are used to capture N+1 images because there may be no prism at the center of the array, since a prism is not required to shift rays at the principal or main axis of the optical system.

Based on equation 7, the light-field camera of FIG. 5B is optically equivalent to the camera illustrated in FIG. 5A. The array of shifted lenses in FIG. 5A has been replaced with one central lens and an array of prisms. Equation 7 represents the relations between focal lengths, shifts, and prism angles that make the two camera systems optically equivalent. In FIG. 5B, different prisms tilt rays that would otherwise converge to the same point in different directions, separating them onto different locations in the image plane and forming different sub-images. Those different sub-images are of the type illustrated in FIG. 2C, which may be a more efficient design than conventional plenoptic cameras.

Figure 5C:
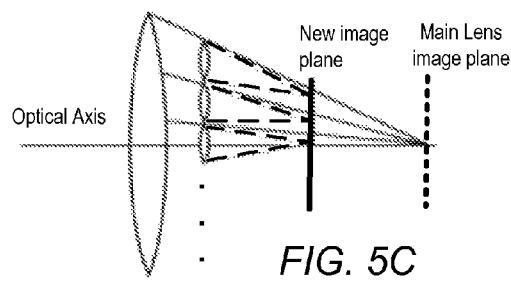
FIG. 5C illustrates a light-field camera design embodiment that incorporates an array of multiple positive lenses internal to the camera and proximate to the main or objective lens.

FIG. 5C illustrates a light-field camera design embodiment that incorporates an array of multiple positive lenses internal to the camera and proximate to the main or objective lens. (In contrast, the array of microlenses in a conventional plenoptic camera as illustrated in FIG. 1B is proximate to the photosensor.) As shown above, a shifted lens is equivalent to a lens with a prism. Accordingly, this light-field design is optically equivalent to an array of cameras. If there are N lenses in the array of positive lenses, N images from the N positive lenses may be captured on N regions of the camera's photosensor. Note, however, that in this design, the positive lenses act to move the image plane forward, or closer to the main lens than the original location of the image plane of the main lens. Thus, this embodiment would allow for a more compact camera body or enclosure at least in the front-to-back dimension.

In FIG. 5C, the additional small positive lenses focus light rays closer than the original focal plane of the main lens. Thus, the small positive lenses form individual images instead of being integrated into one image as in conventional one-optical-axis cameras. Again, this is "at least approximately correct" as a design, and application of equation 7 may be used to prove that it is exactly correct and to find the exact values of the parameters (in terms of equivalence with FIG. 5B.) In more detail, each of the shifted lenses in FIG. 5C is equivalent to a big lens on the optical axis and a prism. The big lens may be combined in one with the main lens, and equivalence with FIG. 5B is obtained.

Figure 5D:
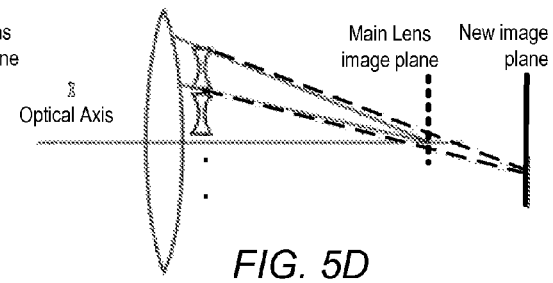
FIG. 5D illustrates a light-field camera design embodiment that incorporates an array of multiple negative lenses internal to the camera and proximate to the main or objective lens.
Figure 5E:
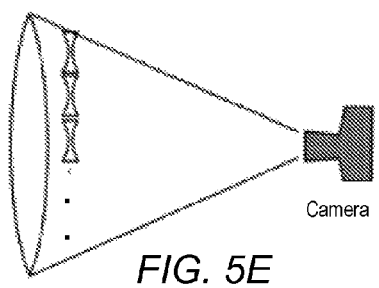
FIG. 5E shows an external light-field camera design that uses a single large lens and an array of negative lenses placed between the object field and the main lens of the camera, according to one embodiment.

FIG. 5D illustrates a light-field camera design embodiment that incorporates an array of multiple negative lenses internal to the camera and proximate to the main or objective lens. (In contrast, the array of microlenses in a conventional plenoptic camera as illustrated in FIG. 1B is proximate to the photosensor.) As shown above, a shifted lens is equivalent to a lens with a prism. Accordingly, this light-field design is optically equivalent to an array of cameras. If there are N lenses in the array of negative lenses, N images from the N negative lenses may be captured on N regions of the camera's photosensor. Note, however, that in this design, the negative lenses act to move the image plane backward, or further away from the main lens than the original location of the image plane of the main lens.

The embodiment in FIG. 5D is similar to the embodiment of FIG. 5C, only with negative lenses. The embodiments in FIG. 5C and FIG. 5D may be used practically if an array of 10-20 (positive or negative) lenslets is integrated into the barrel of a conventional camera lens proximate to the main lens, and may be used with a high resolution camera as a compact light-field camera. Note that, while 10-20 lenslets is mentioned as possibly optimal for practical applications, some embodiments may use fewer than 10 or more than 20 lenslets in the array.

Figure 16:
FIG. 16 illustrates an exemplary conventional camera with a tube or attachment that incorporates the optical components of the light-field camera design illustrated in FIG. 5E.

FIG. 5E illustrates a light-field camera design embodiment that appears similar to the arrangement shown in FIG. 5D; however, this embodiment uses an optical component including multiple optical elements that is placed in front of (external to) the main lens of a conventional camera. The optical component consists of a single, relatively large lens, arranged in front of an array of negative lenses. The array of negative lenses is thus physically between the single large lens and the main lens of the camera. In some embodiments, the single, relatively large lens may be composed of two or more optical elements arranged in a stack and, in contrast to the array of optical elements which are arranged perpendicular to the optical axis, centered relative to each other along the optical axis. The optical component may be assembled in a tube or attachment, which may attach to the conventional camera main lens via any standard, or optionally by custom, camera lens attachment mechanisms. An exemplary conventional camera with such a tube or attachment that incorporates the optical component illustrated in FIG. 5E is shown in FIG. 16, in this example mounted on a tripod. Note that the assembly shown in FIG. 16 looks somewhat similar to a conventional camera with a conventional large telephoto lens attached.

Optically, the embodiment illustrated in FIG. 5E may be similar to the embodiment illustrated in FIG. 4 and described in U.S. Patent Application 2007/0230944, which was previously incorporated by reference. The image plane created by the array of negative lenses is approximately at the main lens of the conventional camera. The main lens of the conventional camera sees and "captures" the N images from the N negative lenses as one image, and focuses the captured image on the photosensor of the camera. Thus, the N images from the N negative lenses may be captured on N regions of the camera's photosensor.

In an exemplary embodiment according to FIG. 5E, N may be 20; in other words, 20 negative lenses may be used. Other embodiments may use other numbers of negative lenses in the array. In some embodiments, for example in an embodiment with 20 negative lenses, the negative lenses may be manufactured, or alternatively may be cut or milled, into squares or rectangles, and the negative lenses may thus be closely arranged in a square or rectangle. In FIG. 16, for example, an exemplary embodiment with 20 negative lenses each cut into a square and arranged in a 4×5 rectangle at the front of the attachment to the camera can be seen.

Because of chromatic problems with prisms in some embodiments, better images may be produced in some embodiments with the design in FIG. 5E than with the design in FIG. 4. Also, in some embodiments, the lenses and prisms for the design FIG. 4 are not cut into squares, which leads to loss of pixels even with hexagonal packing as illustrated in FIG. 15. Thus, the design illustrated in FIG. 5E may have some image quality advantages over the design illustrated in FIG. 4.

In each of the light-field camera designs illustrated in FIG. 4 and FIGS. 5B through 5E, two different optical components (either a lens and an array of optical elements or two arrays of optical elements, depending upon the design) are described as being proximate or next to each other, generally as close as physically or practically possible. Theoretically, the two different components in each of the designs may be considered in the same plane or at "zero distance" from each other. However, practically, the optical components just need to be arranged such that the distance between the two different components does not influence the desired optical behavior significantly; in other words, the components may be touching or there may be some gap between the components. However, because of the optical characteristics of lenses, too large of a distance may cause a significantly different and undesirable optical behavior. Thus, theoretically, the two components may be considered to be in the same plane, but practically the components may actually be some relatively small distance apart, or may be touching, but in any case, the distance between the two different components is close relative to the distance from the two components to the image plane of the camera. Note that the photosensor is located proximate to the image plane. The distance to the image plane is significant; the two optical components need to be far enough from the image plane for the optical system to work satisfactorily. Note that the optical characteristics of the individual elements in the two components used in embodiments of FIG. 4 and FIGS. 5B through 5E may define the approximate distances from the two components and other elements in the optical system (e.g., the main camera lens in external designs and the photosensor in internal designs), or alternatively the geometric configuration of a camera device to which an embodiment of one of the designs is to be integrated may define or influence the approximate optical characteristics of optical elements used in an implementation of the design.

In addition, some embodiments of internal designs, for example embodiments of the designs illustrated in FIGS. 5C and 5D, may require shortening or lengthening of the distance between the main camera lens/design implementation and the photosensor, as the image plane is shifted either closer or farther away from the main lens by the design implementation. Other internal designs, for example the design illustrated in FIG. 5B, may be integrated directly into an existing camera with appropriate modifications to attach/insert the physical implementation (e.g., an array of prisms as illustrated in FIG. 5B).

FIGS. 6 through 10 illustrate exemplary light-field camera implementations of embodiments of the light-field camera designs illustrated in FIGS. 5A through 5E. In the light-field cameras illustrated in FIGS. 6 through 10, the illustrated photosensor may be a charge-coupled device (CCD) or some other type of electronic device that is capable of capturing digital images. Alternatively, conventional film may be used as the photosensor in some embodiments. Also note that an individual optical element, for example the main or objective lens of a camera illustrated in the Figures, may in practice be a single optical element (e.g., a single piece of optical glass) or alternatively may be composed of a stack of two or more individual optical elements (e.g., individual pieces of optical glass) centered along the optical axis of the optical system (e.g., camera), for example to correct for optical aberrations. However, such a stack of individual optical elements is considered to collectively compose a single optical element or lens. Note that such a stack of optical elements that collectively compose a single optical element is distinctly different than an array of optical elements as described herein, as the elements in such an array are not centered relative to each other along the optical axis of the optical system but instead are arranged perpendicular to the optical axis, and the purpose and optical characteristics of an array of optical elements are distinctly different than the purpose and optical characteristics of a stack of optical elements.

Figure 6:
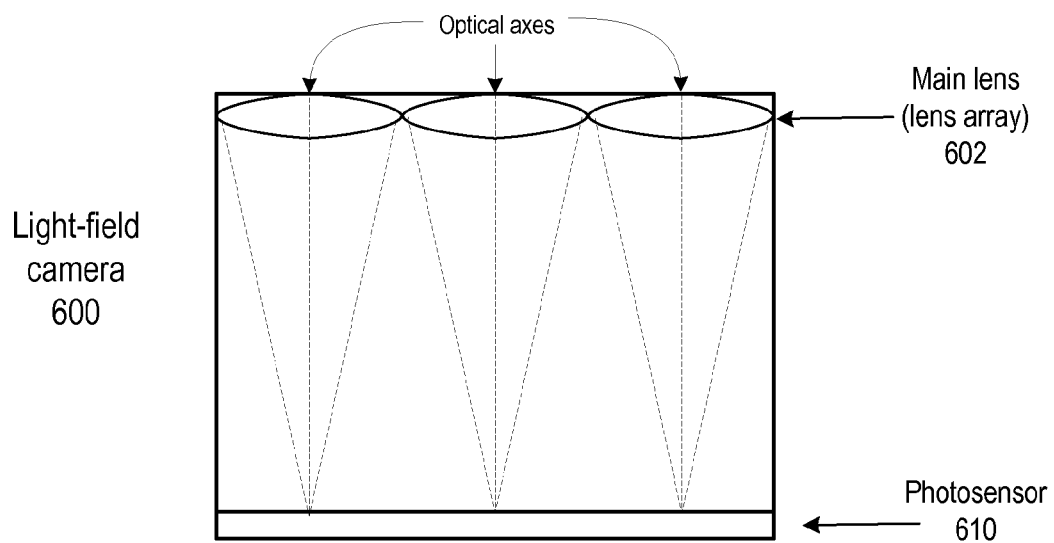
FIG. 6 illustrates a light-field camera implementation of the light-field camera design illustrated in FIG. 5A, according to one embodiment.

FIG. 6 illustrates an exemplary implementation of the light-field camera design illustrated in FIG. 5A, according to one embodiment. Exemplary light-field camera 600 includes a lens array 602 of multiple relatively smaller lenses instead of or as a replacement for a single larger main lens as in conventional cameras. Unlike conventional light-field cameras as illustrated in FIG. 1A, camera 600 is a single camera rather than an array of distinct and separate cameras. N images from the N lenses may be captured on N regions of the camera's photosensor 610. In the illustrated embodiment, the lenses in lens array 602 are shown as positive lenses; in an alternative embodiment, the lenses may be negative lenses.

Figure 7:
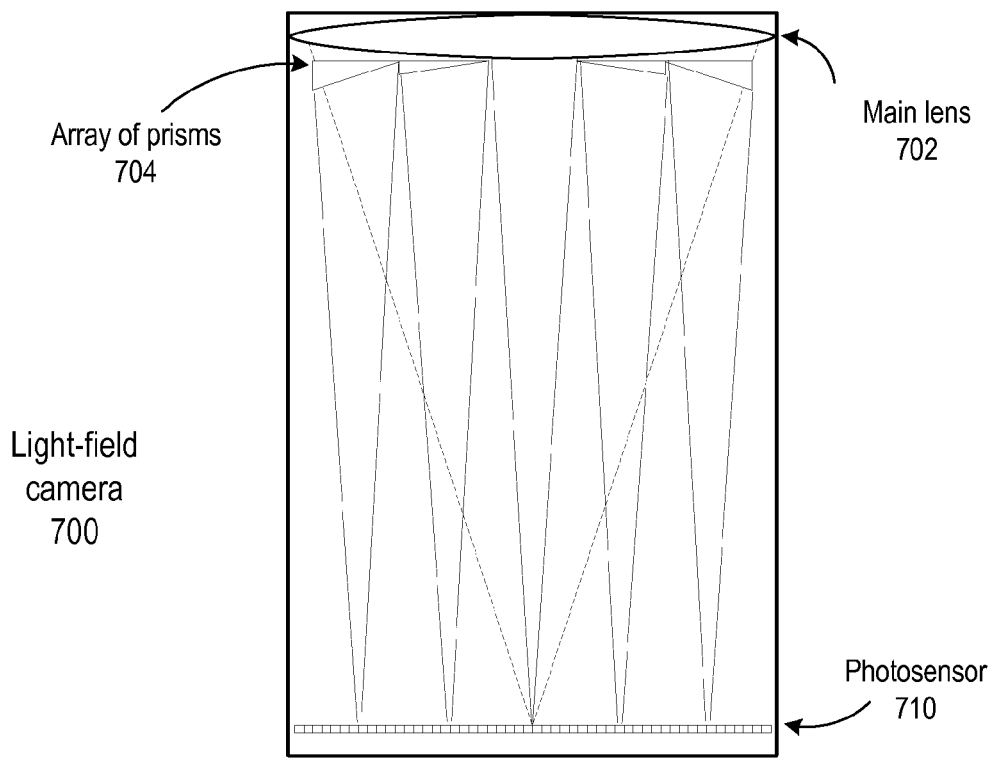
FIG. 7 illustrates a light-field camera implementation of the light-field camera design illustrated in FIG. 5B, according to one embodiment.

FIG. 7 illustrates an exemplary implementation of the light-field camera design illustrated in FIG. 5B, according to one embodiment. Light-field camera 700 incorporates an array 704 of multiple prisms internal to the camera and proximate to the main or objective lens 702. The prisms in the array 704 each act to tilt rays from the main lens 702 onto a corresponding region of the photosensor 710.

Figure 8:
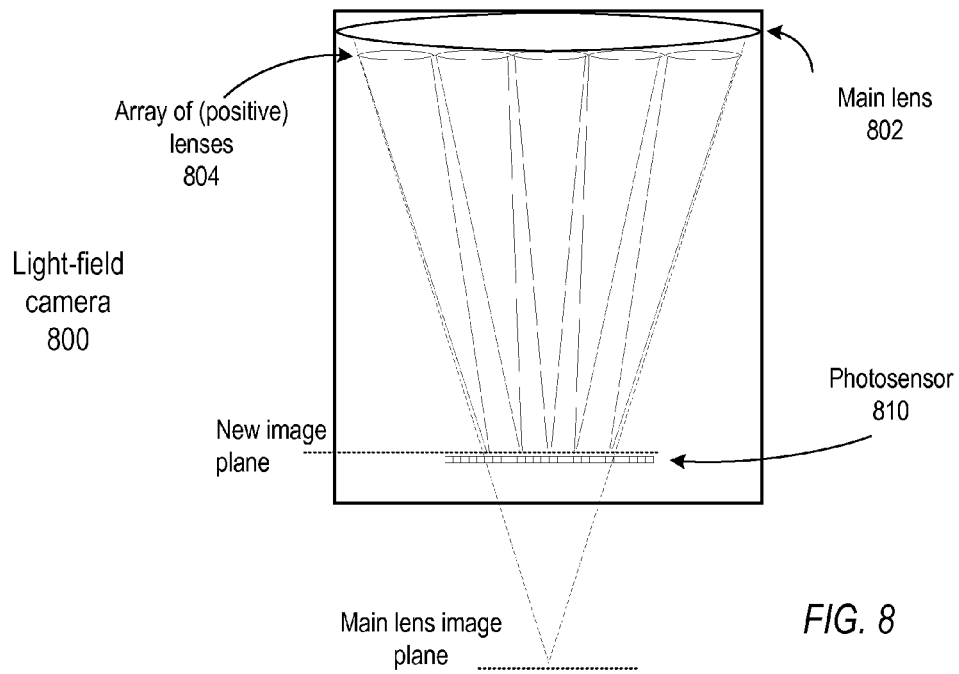
FIG. 8 illustrates a light-field camera implementation of the light-field camera design illustrated in FIG. 5C.

FIG. 8 illustrates an exemplary implementation of the light-field camera design illustrated in FIG. 5C, according to one embodiment. Light-field camera 800 incorporates an array 804 of multiple positive lenses internal to the camera and proximate to the main or objective lens 802. The positive lenses act to move the image plane forward, or closer to the main lens 802 than the original location of the image plane of the main lens 802.

Figure 9:
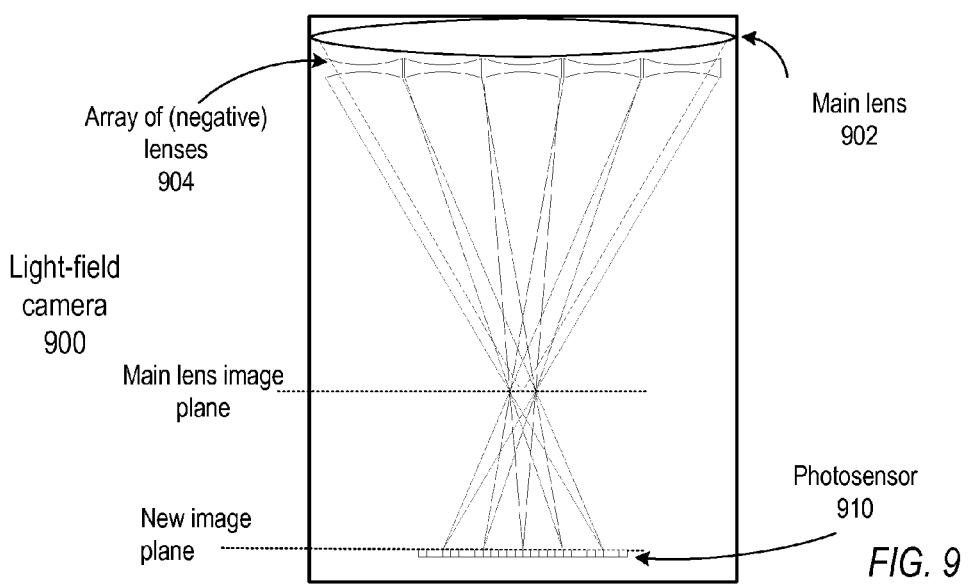
FIG. 9 illustrates a light-field camera implementation of the light-field camera design illustrated in FIG. 5D, according to one embodiment.

FIG. 9 illustrates an exemplary implementation of the light-field camera design illustrated in FIG. 5D, according to one embodiment. Light-field camera 900 incorporates an array 904 of multiple negative lenses internal to the camera and proximate to the main or objective lens 902. The negative lenses act to move the image plane backward, or further away from the main lens 902 than the original location of the image plane of the main lens 902.

Figure 10:
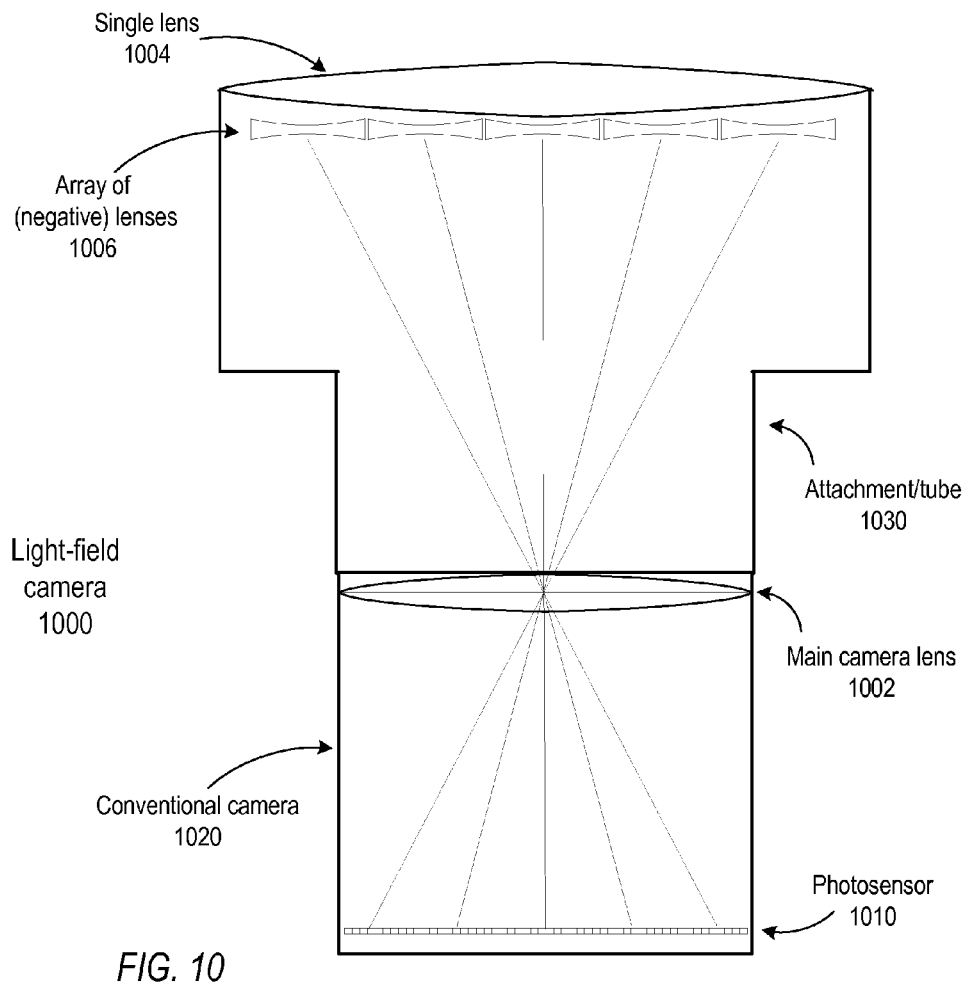
FIG. 10 illustrates a light-field camera implementation of the light-field camera design illustrated in FIG. 5E, according to one embodiment.

FIG. 10 illustrates an exemplary implementation of the light-field camera design illustrated in FIG. 5E, according to one embodiment. Light-field camera 1000 includes multiple optical elements that are placed in front of (external to) the main lens 1002 of a conventional camera 1020. The optical elements include a single, relatively large lens 1004, arranged in front of an array 1006 of negative lenses. The array 1006 of negative lenses is thus physically between lens 1004 and the main lens 1002 of conventional camera 1020. Lens 1004 and array 1006 may be assembled in a tube or attachment 1030, which may attach to the conventional camera 1020 via any standard, or optionally by custom, camera lens attachment mechanisms. An exemplary conventional camera with such a tube or attachment 1030 that incorporates the optical component illustrated in FIG. 5E is shown in FIG. 16, in this example mounted on a tripod. Note that the assembly shown in FIG. 16 looks somewhat similar to a conventional camera with a conventional large telephoto lens attached. In an alternative embodiment to an attachment that includes lens 1004 and array 1006 but does not include main camera lens 1002, lens 1004, array 1006, and a main lens 1002 for the camera may all be assembled in a tube or attachment that is configured to be attached or mounted to a camera body.

Figure 11A:
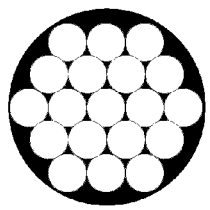
FIGS. 11A through 11D illustrate exemplary configurations for arrays of optical elements in various embodiments of the light-field cameras.
Figure 11B:
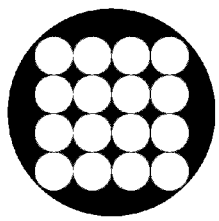
Figure 11C:
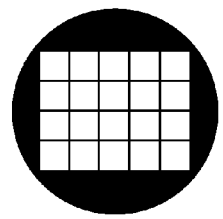
Figure 11D:
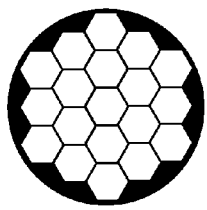

In the light-field camera designs illustrated in FIG. 4, FIGS. 5A through 5C, and FIGS. 6 through 10, the various arrays of optical elements (positive lenses, negative lenses, or prisms) may be arranged according to various geometric configurations. In addition, the individual optical elements may be manufactured or milled/cut into various geometric shapes. Generally, in embodiments of the arrays that are composed of positive or negative lenses, the size, shape, and optical characteristics of all of the lenses in the array will be the same. For arrays of prisms, the optical characteristics of the prisms may vary according to the prisms' distance from the optical axis of the camera. FIGS. 11A through 11D illustrate some exemplary configurations for arrays of optical elements in various embodiments. Note that the shapes and arrangements of the optical elements are exemplary, and are not intended to be limiting. Also note that, for arrays including prisms, the center location of the array (the location at the optical axis of the camera) may not include an optical element with prismatic optical characteristics. FIG. 11A shows an array of nineteen individually circular optical elements arranged in a hexagonal pattern. FIG. 11B shows an array of sixteen individually circular optical elements arranged in a square. FIG. 11C shows an array of twenty individually square optical elements arranged in a 4×5 rectangle. FIG. 11D shows an array of nineteen individually hexagonal optical elements arranged in a hexagon. Note that, while the multiple optical elements arranged in arrays as described in the various embodiments are generally described as being separate individual optical elements composed into the array, in some embodiments the multiple optical elements in such an array may be cast, formed, milled, cut, or otherwise manufactured in a single sheet of optical glass or other optical material.

The black circles in FIGS. 11A through 11D may represent a housing for the optical elements in the array. While the housings are shown in these Figures to be circular, the housings may be of other geometric shapes, such as square, rectangular, or hexagonal. The housings may be opaque to light so that light from a subject only passes through the optical elements. The housings may be made of a metal, alloy, plastic, composite material, or in general of any suitable substance or combination of substances. In various embodiments, a housing and array of optical elements may be integrated with a camera or attachment (see, e.g., FIG. 10) or alternatively may be a removable and replaceable/interchangeable component or module. Further, the optical elements may be integrated with the housing or may be removable and replaceable. Further note that some embodiments may not include a housing for an array of optical elements.

Figure 12:
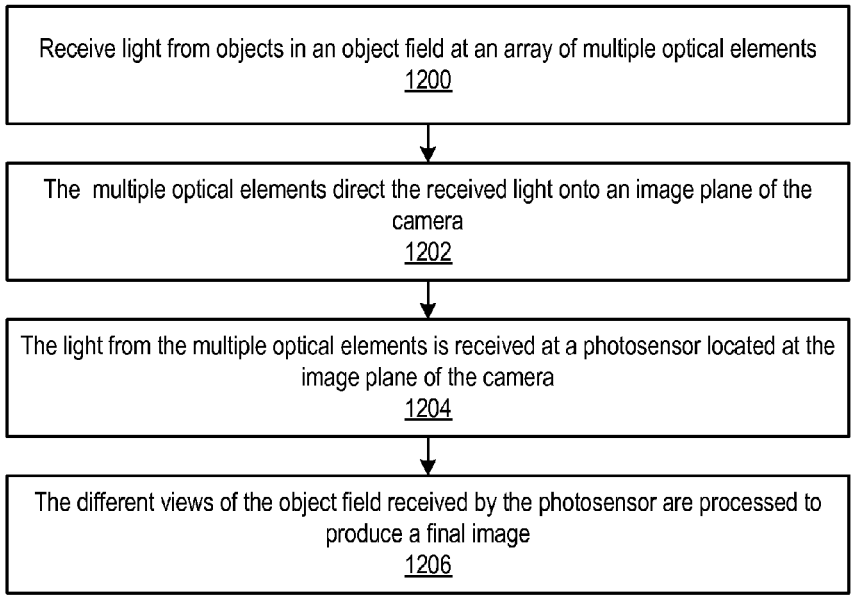
FIG. 12 is a flow chart illustrating how light is directed within a light-field camera in accordance with an embodiment of a light-field camera design as illustrated in FIG. 5A and FIG. 6.

FIG. 12 is a flow chart illustrating how light is directed within a light-field camera in accordance with an embodiment of a light-field camera design as illustrated in FIG. 5A and FIG. 6. At 1200, light is received from objects in an object field at an array of multiple optical elements (e.g., positive lenses) that act as the main lens of the camera. Each optical element in this array receives light from the object field from a different angle, and consequently directs a different view of the object field into camera. At 1202, the multiple optical elements direct the received light onto an image plane of the camera. At 1204, the light from the multiple optical elements is received at a photosensor located at the image plane of the camera. The photosensor receives a different view of the object field from each optical element in the array. Finally, at 1206, the different views of the object field which are received by the photosensor may be processed to produce a final image.

Figure 13:
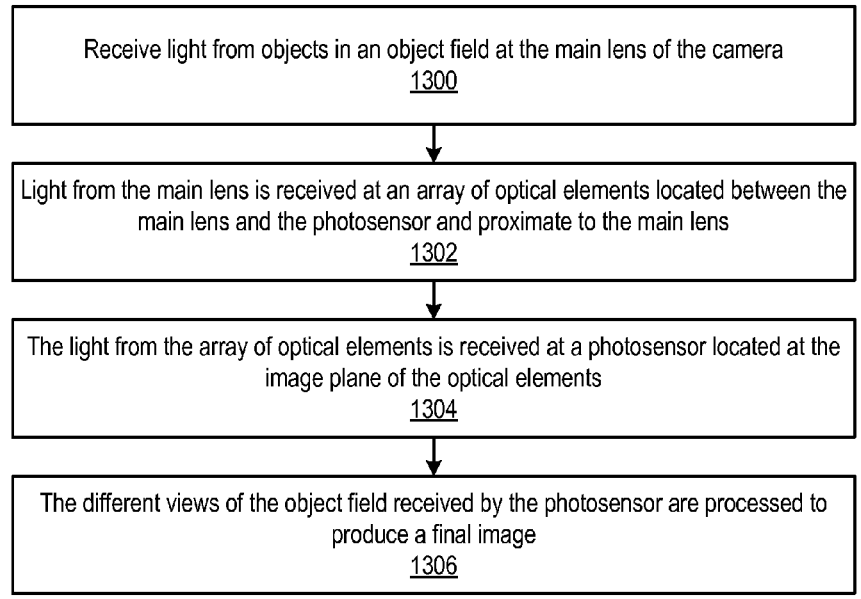
FIG. 13 is a flow chart illustrating how light is directed within a light-field camera in accordance with an embodiment of a light-field camera design internal to the camera, as illustrated in FIGS. 5B through 5D and FIGS. 7 through 9.

FIG. 13 is a flow chart illustrating how light is directed within a light-field camera in accordance with an embodiment of a light-field camera design internal to the camera, as illustrated in FIGS. 5B through 5D and FIGS. 7 through 9. At 1300, light is received from objects in an object field at the main lens of the camera. At 1302, light from the main lens is received at an array of optical elements (prisms, positive lenses, or negative lenses) located between the main lens and the photosensor, but proximate to the main lens (in contrast to conventional plenoptic cameras as illustrated in FIG. 1B, where the array of microlenses is located proximate to the photosensor). Each optical element in the array receives light from the main lens and consequently directs a different view of the main lens onto an image plane located at the photosensor. At 1304, light is received from the array of optical elements at the photosensor located at the image plane of the optical elements. The photosensor receives a different view of the object field from each optical element in the array. Finally, at 1306, the different views of the object field which are received by the photosensor may be processed to produce a final image.

Figure 14:
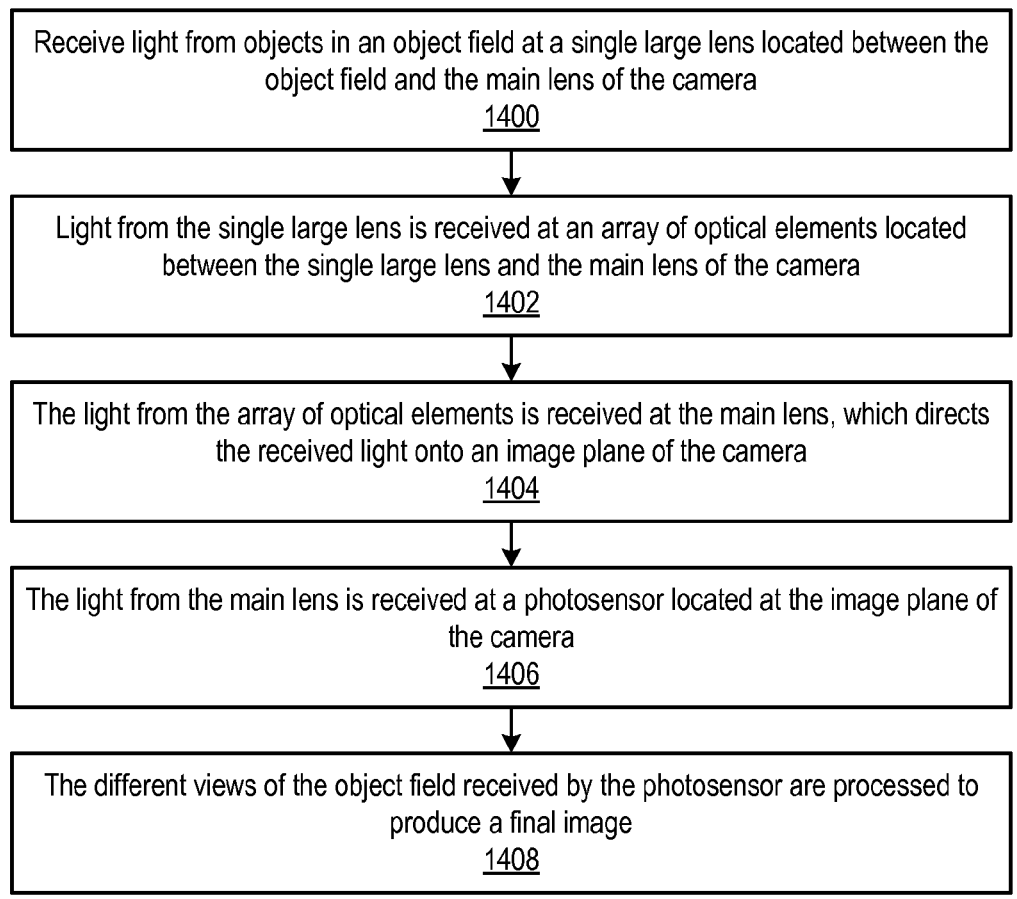
FIG. 14 is a flow chart illustrating how light is directed within a light-field camera in accordance with an embodiment of a light-field camera design external to the camera as illustrated in FIG. 5E and FIG. 10.

FIG. 14 is a flow chart illustrating how light is directed within a light-field camera in accordance with an embodiment of a light-field camera design external to the camera as illustrated in FIG. 5E and FIG. 10. At 1400, light is received from objects in an object field at a single large lens located between the object field and the main lens of the camera. At 1402, light from the single large lens is received at an array of optical elements (e.g., negative lenses) located between the single large lens and the main lens of the camera. Each optical element in this array receives light from the object field from a different angle, and consequently directs a different view of the object field onto the main lens. At 1404, light is received from the array of optical elements at the main lens, which directs the received light onto an image plane of the camera. At 1406, light is received from the main lens at a photosensor located at the image plane of the camera. The photosensor receives a different view of the object field from each optical element in the array. At 1408, the different views of the object field which are received by the photosensor may be processed to produce a final image.

Captured Image Processing/Rendering

The following describes embodiments of methods of processing and rendering light-field images, for example light-field images captured using embodiments of the various light-field camera designs illustrated in, and described in relation to, FIG. 4, FIGS. 5A through 5E, FIGS. 6 through 10, and FIGS. 12 through 14. The described methods of processing and rendering light-field images may be implemented as or in a tool, module, library function, plug-in, stand-alone application, etc. For simplicity, implementations of embodiments of the described methods of processing and rendering light-field images may be referred to herein as a light-field processing module. Alternatively, or in addition, other light-field rendering or processing techniques may be applied to captured light-field images by a light-field processing module, and/or by other modules. U.S. Patent Application 2007/0230944, previously incorporated by reference, describes other methods, algorithms, and techniques for processing/rendering light-field images captured by a light-field camera that may be applied to light-field images captured by embodiments of light-field cameras as described herein.

Figure 17:
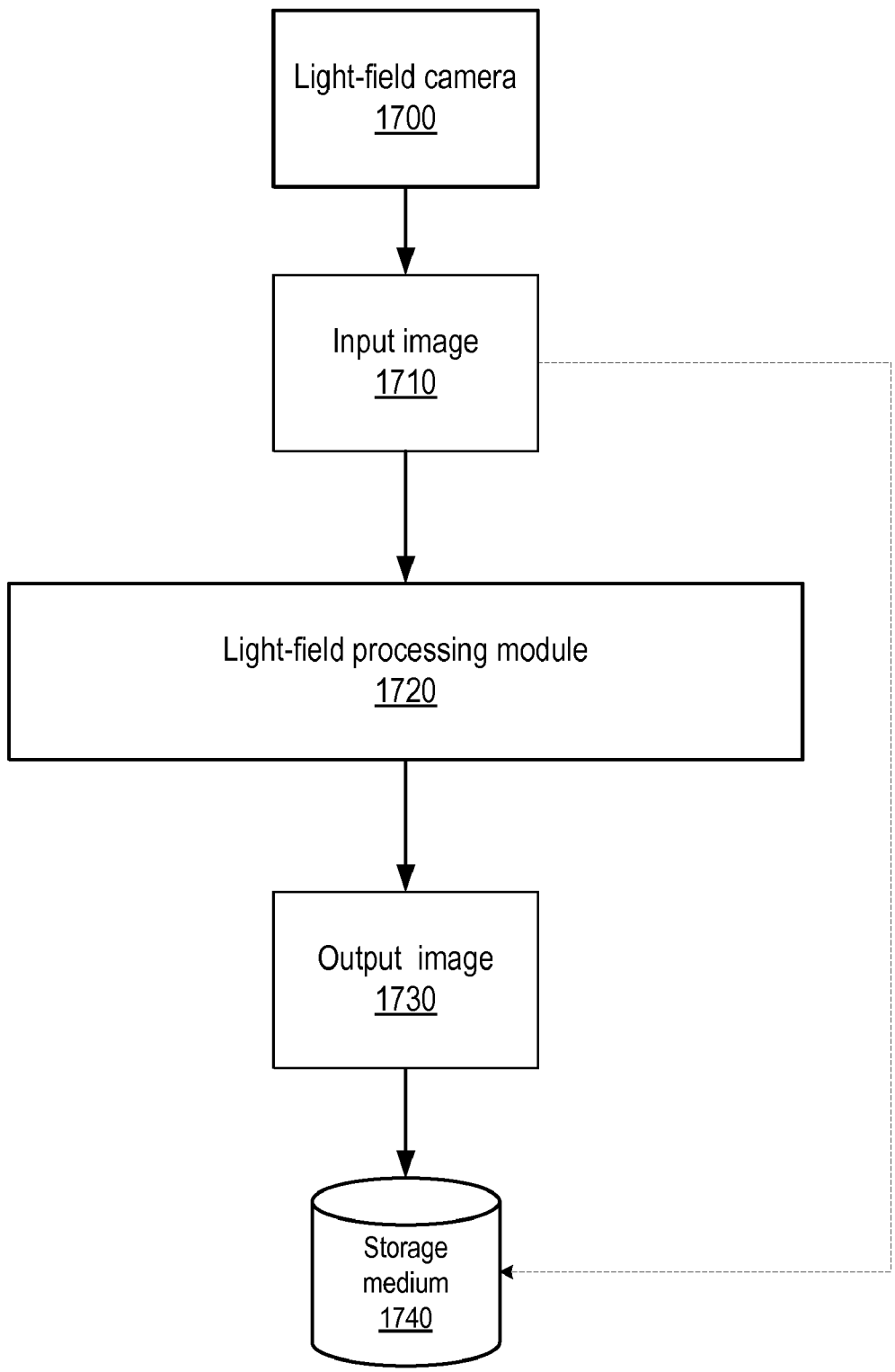
FIG. 17 illustrates processing a light-field image by a light-field processing module according to one embodiment.
Figure 18:
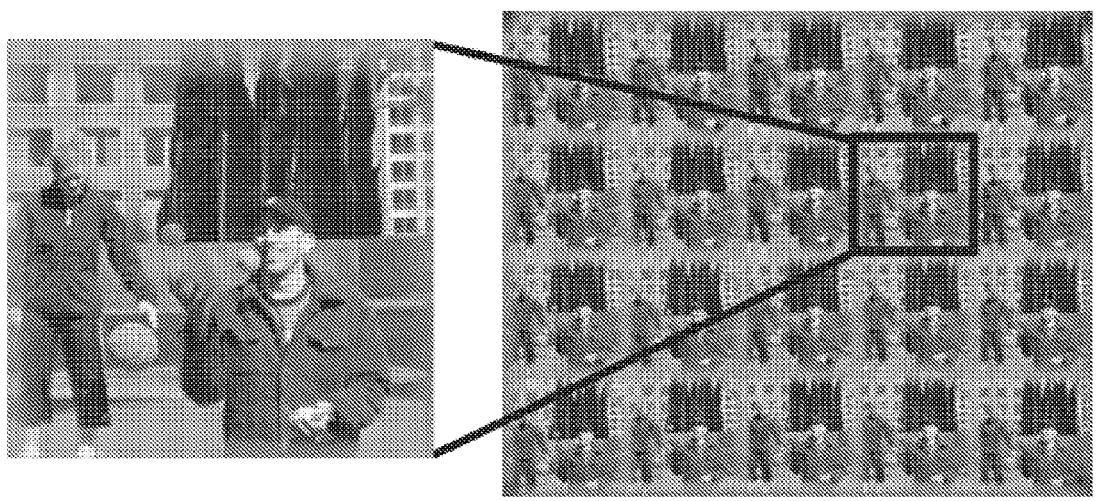
FIG. 18 illustrates an exemplary light-field image as captured by an exemplary embodiment of a light-field camera.
Figure 21A:
FIGS. 21A through 21C illustrate synthetic aperture photography of motion focusing at different depths, according to one embodiment.
Figure 21B:
Figure 21C:
Figure 22:
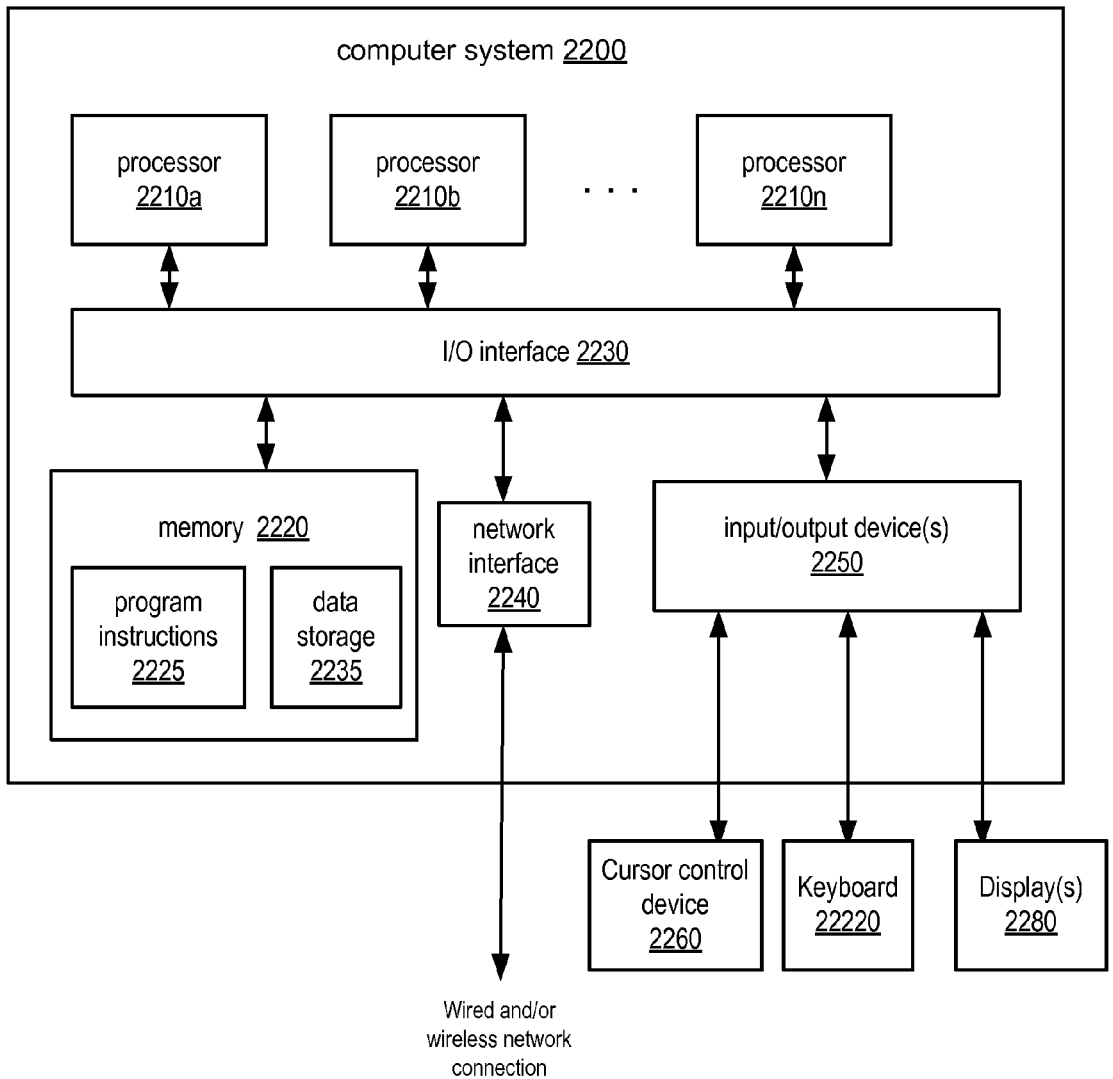
FIG. 22 illustrates an exemplary computer system that may be used in embodiments.

FIG. 17 illustrates processing a light-field image by a light-field processing module according to one embodiment. FIG. 22 illustrates an exemplary computer system on which embodiments of light-field processing module 1720 may be implemented. Referring to FIG. 17, light-field processing module 1720 receives an input image 1710 captured by a light-field camera, such as one of the embodiments of light-field cameras described herein. An exemplary light-field image as captured by an exemplary embodiment of a light-field camera is illustrated in FIG. 18. Light-field processing module 1720 then processes the input image 1710 according to one or more of the methods described herein. Light-field processing module 1720 generates an output image 1730. FIGS. 21A through 21C illustrate several exemplary output images produced from the exemplary light-field image illustrated in FIG. 18. Output image 1730 may, for example, be stored to a storage medium 1740, such as system memory, a disk drive, DVD, CD, etc. The dashed line from input image 1710 to storage medium 1740 indicates that the original (input) light-field image 1710 may also be stored.

Synthetic Aperture Photography

In embodiments, light-fields may be used to simulate the defocus blur of a conventional lens by re-projecting some or all of the images onto a (real or virtual) focal plane in the scene and computing their average. Objects on this plane will appear sharp (in focus), while those not on this plane will appear blurred (out of focus) in the resulting image. This synthetic focus can be thought of as resulting from a large-aperture lens, the viewpoints of light-field images being point samples on the lens surface. This method goes under the name of synthetic aperture photography. It creates a strong sense of 3D; further, summing and averaging all the rays serves as a noise reduction filter, hence the resulting image has superior signal-to-noise ratio (SNR) compared to the original inputs.

The projection and averaging approach to synthetic aperture may require a dense light-field. However, some embodiments of light-field cameras as described above may employ relatively sparse samplings comprised of 20 or fewer images, for example. Simply projecting and averaging such an image set may result in pronounced ghosting artifacts, essentially the result of aliasing in the sampled light-field. Reconstruction filters may be used to reduce the aliasing in undersampled light-fields; however, even with more, for example 256, images, some artifacts may remain.

Instead, in some embodiments, the aliasing problem may be addressed by generating more camera views than those provided directly by the camera array through view morphing. This is equivalent to generating a synthetic light-field by carefully interpolating between the samples in the sparse camera data. Fundamentally, this is possible because of the well-known redundancy of the light-field, which in the Lambertian case is constant along angular dimensions at each point on the surface that is being observed. In the following subsections, a method is described for filling out the light-field and for using it to generate synthetic aperture images.

Synthetic Light-Field by Tri-View Morphing

Figure 19:
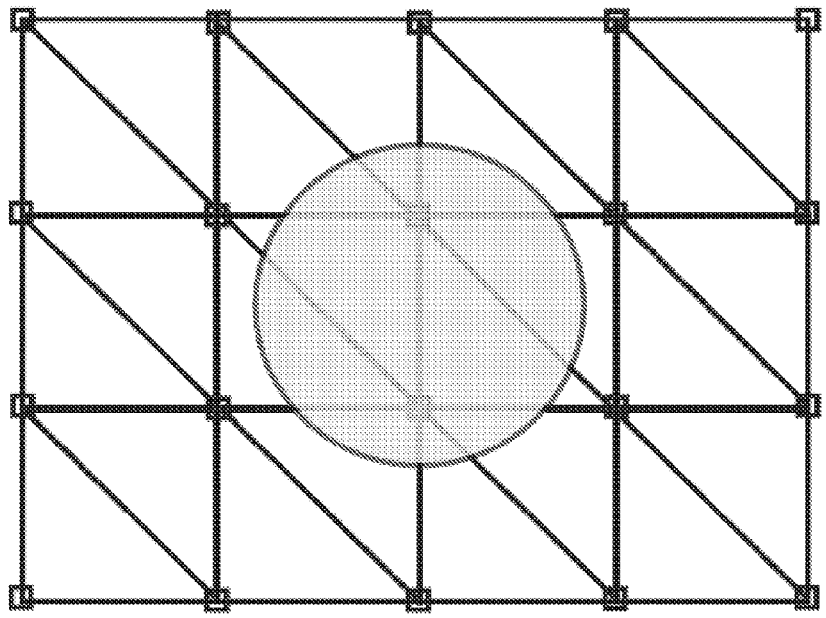
FIG. 19 illustrates a triangular mesh that may be used in a tri-view morphing method implemented in an embodiment of a light-field processing module.

In some embodiments, sampling may include viewpoints that lie on a grid. This grid may be tessellated into a triangular mesh, as illustrated in FIG. 19. Embodiments may be able to fill in arbitrary viewpoints within the grid. As described below, this may be done by computing warps that allow view morphing between each pair of views connected by an edge. These warps may then be combined to allow barycentric interpolation of views within each triangle of viewpoints.

View Morphing with Segmentation-Based Stereo

View morphing is a method for interpolating two reference images to generate geometrically correct in-between views from any point on the line connecting the two initial centers of projection. To achieve this effect, a correspondence may be needed between the pair of images.

Recently, color segmentation approaches have gained in popularity for dense correspondence computation. These approaches use color discontinuities to delineate object boundaries and thus depth discontinuities. Also, these approaches model mixed color pixels at boundaries with fractional contributions (a.k.a. matting) to reduce artifacts at depth discontinuities.

Some embodiments may build on a segment-based optical flow method of Zitnick et al. described in ZITNICK C. L., JOJIC N., KANG S.: Consistent segmentation for optical flow estimation, In Proceedings of IEEE International Conference on Computer Vision (ICCV) (2005), which is herein incorporated by reference in its entirety. The idea behind the Zitnick et al. method is to model each pixel's color as the blend of two irregularly-shaped segments with fractional contributions a and then solve for a mutual segmentation between a pair of images that gives rise to segments with similar shapes and colors. In embodiments, the Zitnick et al. method flow algorithm may be modified, for example in one or both of the following two ways. First, between each pair of images, the matched segments may be required to lie along epipolar lines. Second, epipolar flow may be simultaneously computed between an image and two neighbors defining a triangle, so that the segments in each image are consistent between neighbors needed for tri-view morphing, described in the next subsection.

Tri-View Blending

Any linear combination of two parallel views gives a valid interpolated projection of the scene. Multiple image morphing has been used to extend two-view morphing to morphing among three or more views and into a complete image-based 3D system. Tri-view morphing is a more recent system for creating the appearance of 3D via multi-image morphing, making use of the trifocal tensor to generate the warping transforms among three views.

A method for tri-view morphing within triangles on a camera grid as illustrated in FIG. 19 is summarized as follows. Given three images $I_1$, $I_2$ and $I_3$, the method morphs to the target image $I_s$ using barycentric coefficients $\lambda_1$, $\lambda_2$ and $\lambda_3$. Let $W_{ij}$ be the warping vector field (or "flow") from image $I_i$ to image $I_j$, according to the disparity map from $I_i$ to $I_j$ obtained using the segmentation-based stereo algorithm described above. Ideally, this warping function will convert image $I_i$ into an image identical to $I_j$. In general, warping any image I by a vector field W will produce a new image denoted as I(W). The method may warp each of the input images to $I_s$ using affine (barycentric) combination of the three vector fields, and then blend them together based on the same barycentric coefficients:

$$I_{out} = \sum_{i=1}^{3} \lambda_i I_i \left( \sum_{j=1}^{3} \lambda_j W_{ij} \right)$$

Note that the method may generally sample within the camera grid, so that the desired image is inside of a triangle defined by the three input images $I_i$, and then $\lambda_i \geq 0$ and $$\sum_{i=1}^{3} \lambda_i = 1.$$

Extrapolation outside the grid may also be feasible to some extent, in which case one or more barycentric coordinates will be negative.

Synthetic Aperture Rendering

To simulate the defocus of an ordinary camera lens, an aperture location and size on the camera grid may be defined (see FIG. 19). Then, the method may densely sample within this aperture using tri-view morphing. Finally, the method may determine an in-focus plane, project all images within the aperture onto this plane, and average.

Results

Results provided and described herein are based on images taken with an exemplary embodiment of a light-field camera implemented according to the design shown in FIG. 5E. The implemented embodiment according to that design is described below.

An exemplary embodiment of a light-field camera implemented according to the camera design of FIG. 5E was built with an array of 4×5 negative lenses cut into squares and attached to each other with minimal loss of space. Before being glued together, the lenses were placed with their flat sides facing downward on a piece of glass, to be well aligned on a plane and parallel to each other. Since all lenses in this embodiment have the same focal length,—105 mm—their focal points are on one plane. This plane is perpendicular to the direction of view to the precision of lens manufacturing. The array of lenses, and large single lens, are integrated into a tube or attachment that is mountable or attachable to a conventional camera (the conventional camera including a main, or objective lens). FIG. 10 illustrates a block diagram of the light-field camera, and FIG. 11C illustrates the configuration of the array of optical elements (in this example, negative lenses). FIG. 16 shows the completed sparse light-field camera, with two positive lenses (the large single lens 1004 and the main camera lens 1002 illustrated in FIG. 10) and an array of 20 square negative lenses (located between the large single lens 1004 and the main camera lens 1002, and proximate to lens 1004) in front of a conventional camera body.

The camera centers may be calibrated using an off-the-shelf structure-from-motion (SFM) system that recovers both the intrinsic and the extrinsic parameters of the camera. For the purposes of synthetic aperture, a calibration method may be, for example as discussed by Vaish et al. in VAISH V., WILBURN B., JOSHI N., LEVOY M.: Using plane+parallax to calibrate dense camera arrays, In Proceedings of IEEE Conference on Computer Vision and Pattern Recognition (CVPR) (2004), which is herein incorporated by reference in its entirety, in which relative camera positions are recovered.

FIG. 18 shows an exemplary sparse light-field image captured with a light-field camera according to one embodiment. A similar image may be captured by any of the embodiments of light-field cameras as described herein. On the right is a set of 20 images or views that collectively compose the captured sparse light-field image. The image on the right may be considered a composite image that includes each of the separate images of a scene projected onto the photosensor by the optical system of the light-field camera in a separate region of the composite image. A close-up of one of the images or views is shown on the left. The hazy edges are defocused images of the boundaries of the optical elements of the optical system of the light-field camera. For the results described herein, these contaminated pixels were discarded. Each vertex in the exemplary mesh shown in FIG. 19 represents one camera view (i.e. one view captured by one of the optical elements in an array of optical elements in the light-field camera). The camera plane may be decomposed into triangles, as illustrated in FIG. 19. Any novel camera view inside these triangles can be synthesized using tri-view morphing, as described above. The circular region represents a possible virtual aperture to be simulated, as described above.

Renderings

With a camera according to one embodiment, twenty views may be captured at a single exposure, with each view containing roughly 700 by 700 pixels (see FIG. 18). In one embodiment, twenty-four triangles may be formed to cover the entire viewing space (see FIG. 19). In one embodiment, the relative locations of all the cameras may be recovered by running SFM on the 20 images. Once the size, location, and shape of a virtual lens is specified, viewpoints may be densely sampled using the tri-view morphing algorithm at one reference depth, according to one embodiment. All examples shown here were sampled with about 250 views. Sweeping through planes of different depths corresponds to shifting all views accordingly. By shifting and summing all the sampled views, synthetic aperture images may be computed at different depths.

Figure 20:
FIG. 20 illustrates synthetic aperture photography, and refocusing to different depths, according to one embodiment.
Figure 20:
Figure 20:

FIG. 20 illustrates synthetic aperture photography of flying birds, refocusing to different depths, according to one embodiment. In the seagull example of FIG. 20, refocusing is demonstrated at three different depths from near to distant.

As a motion example, three sets of results from the input image illustrated in FIG. 18 are presented in FIGS. 21A through 21C. FIGS. 21A through 21C are used to illustrate synthetic aperture photography of human motion focusing at different depths, according to one embodiment. FIG. 21A shows three novel views generated using tri-view morphing. Three synthesized novel views inside a triangle of input images are shown. Despite the slight motion blur of the tennis balls, the interpolated views look realistic, with clean and smooth boundaries. FIG. 21B shows synthetic aperture results with the focal plane moving from near to far. Three synthetic aperture images are shown, focusing at three different depths. FIG. 21C shows synthetic aperture results with varying depth of field. The effect is created with varying aperture size. The left image and the middle image have the exact same virtual aperture. However, the leftmost image demonstrates sparse sampling. Notice that the number of samplings makes a significant and noticeable difference, as the left uses only 24 views, and reveals strong aliasing in blurred regions, while the middle image uses over 200 views. The right image shows an even larger aperture that spans outside the area of the input camera array, showing that view extrapolation also produces reasonable results for this application.

Results also include sequences of synthetic aperture images as the focal plane sweeps through a family of planes that spans the depths of the scenes. The sharpness of objects on the focal plane, together with the smooth blur, indicates the accuracy of the technique, according to one embodiment. The size of the virtual aperture used in the seagulls example (FIG. 20) and in most results of the juggling scene (FIGS. 21A-21C) is about one quarter of the entire viewing region.

In some embodiments, most of the computing cycles may be spent on generating in-between views. An analysis on the sampling bounds may be performed for better efficiency. How densely to sample the viewing space in order to create non-aliased results may be determined. Furthermore, one embodiment may include the possibility of skipping the entire process of view interpolation, and instead realizing refocusing directly from the disparity map.

In one exemplary embodiment, twenty views are used in a light-field camera implementation. For typical scenes, good results are achieved with this embodiment, but for scenes with more complex 3D structure, it is possible that artifacts may be observed. Some embodiments may include dynamically adjusting the number of captured views based on scene geometry so that results with optimal resolution may be achieved.

Exemplary System

Various embodiments of a light-field processing module may be executed on one or more computer systems, which may interact with various other devices. One such computer system is illustrated by FIG. 22. In the illustrated embodiment, computer system 2200 includes one or more processors 2210 coupled to a system memory 2220 via an input/output (I/O) interface 2230. Computer system 2200 further includes a network interface 2240 coupled to I/O interface 2230, and one or more input/output devices 2250, such as cursor control device 2260, keyboard 2270, audio device 2290, and display (s) 2280. In some embodiments, it is contemplated that embodiments may be implemented using a single instance of computer system 2200, while in other embodiments multiple such systems, or multiple nodes making up computer system 2200, may be configured to host different portions or instances of embodiments. For example, in one embodiment some elements may be implemented via one or more nodes of computer system 2200 that are distinct from those nodes implementing other elements.

In various embodiments, computer system 2200 may be a uniprocessor system including one processor 2210, or a multiprocessor system including several processors 2210 (e.g., two, four, eight, or another suitable number). Processors 2210 may be any suitable processor capable of executing instructions. For example, in various embodiments, processors 2210 may be general-purpose or embedded processors implementing any of a variety of instruction set architectures (ISAs), such as the x86, PowerPC, SPARC, or MIPS ISAs, or any other suitable ISA. In multiprocessor systems, each of processors 2210 may commonly, but not necessarily, implement the same ISA.

System memory 2220 may be configured to store program instructions and/or data accessible by processor 2210. In various embodiments, system memory 2220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a light-field processing module, are shown stored within system memory 2220 as program instructions 2225 and data storage 2235, respectively. In other embodiments, program instructions and/or data may be received, sent or stored upon different types of computer-accessible media or on similar media separate from system memory 2220 or computer system 2200. Generally speaking, a computer-accessible medium may include storage media or memory media such as magnetic or optical media, e.g., disk or CD/DVD-ROM coupled to computer system 2200 via I/O interface 2230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2240.

In one embodiment, I/O interface 2230 may be configured to coordinate I/O traffic between processor 2210, system memory 2220, and any peripheral devices in the device, including network interface 2240 or other peripheral interfaces, such as input/output devices 2250. In some embodiments, I/O interface 2230 may perform any necessary protocol, timing or other data transformations to convert data signals from one component (e.g., system memory 2220) into a format suitable for use by another component (e.g., processor 2210). In some embodiments, I/O interface 2230 may include support for devices attached through various types of peripheral buses, such as a variant of the Peripheral Component Interconnect (PCI) bus standard or the Universal Serial Bus (USB) standard, for example. In some embodiments, the function of I/O interface 2230 may be split into two or more separate components, such as a north bridge and a south bridge, for example. In addition, in some embodiments some or all of the functionality of I/O interface 2230, such as an interface to system memory 2220, may be incorporated directly into processor 2210.

Network interface 2240 may be configured to allow data to be exchanged between computer system 2200 and other devices attached to a network, such as other computer systems, or between nodes of computer system 2200. In various embodiments, network interface 2240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2250 may, in some embodiments, include one or more display terminals, keyboards, keypads, touchpads, scanning devices, voice or optical recognition devices, or any other devices suitable for entering or retrieving data by one or more computer system 2200. Multiple input/output devices 2250 may be present in computer system 2200 or may be distributed on various nodes of computer system 2200. In some embodiments, similar input/output devices may be separate from computer system 2200 and may interact with one or more nodes of computer system 2200 through a wired or wireless connection, such as over network interface 2240.

As shown in FIG. 22, memory 2220 may include program instructions 2225, configured to implement embodiments of a light-field processing module as described herein, and data storage 2235, comprising various data accessible by program instructions 2225. In one embodiment, program instructions 2225 may include software elements of a light-field processing module as illustrated in the above Figures. Data storage 2235 may include data that may be used in embodiments. In other embodiments, other or different software elements and data may be included.

Those skilled in the art will appreciate that computer system 2200 is merely illustrative and is not intended to limit the scope of a light-field processing module as described herein. In particular, the computer system and devices may include any combination of hardware or software that can perform the indicated functions, including computers, network devices, internet appliances, PDAs, wireless phones, pagers, etc. Computer system 2200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2200 may be transmitted to computer system 2200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. An apparatus, comprising:
an optical system comprising:
an objective lens, wherein the objective lens is configured to refract light from a scene located in front of an aperture of the optical system; and
a multidimensional optical array, wherein the optical array comprises a plurality of optical elements, wherein each optical element in the optical array is configured to refract light from the objective lens;
a photosensor configured to capture light projected onto the photosensor from the optical system, wherein the photosensor is positioned proximate to an image plane of the optical system;
wherein the optical array is positioned between the objective lens and the photosensor in the apparatus and proximate to the objective lens so that distance between the objective lens and the optical array is small relative to distance from the optical system to the image plane of the optical system such that the objective lens and the optical array are located at substantially a same optical plane to form the image plane as an optical unit; and
wherein each optical element of the optical array is configured to project a separate image of the scene onto a separate location on the photosensor;
wherein the separate images of the scene projected onto the photosensor by the optical array form a multidimensional array of the separate images that includes radiance information, wherein the radiance information indicates distribution of intensity of the light in multiple directions at multiple points.

2. The apparatus as recited in claim 1, wherein the optical elements in the optical array are positive lenses.

3. The apparatus as recited in claim 1, wherein the optical elements in the optical array are negative lenses.

4. The apparatus as recited in claim 1, wherein the optical elements in the optical array are prisms.

5. The apparatus as recited in claim 1, wherein the photosensor is a charge-coupled device (CCD).

6. The apparatus as recited in claim 1, wherein the photosensor is configured to capture a light-field image that includes each of the separate images of the scene projected onto the photosensor by the plurality of optical elements in a separate region of the light-field image.

7. The apparatus as recited in claim 1, wherein the apparatus is a hand-held camera.

8. An apparatus, comprising:
an optical system comprising:
a single lens, wherein the single lens is configured to refract light from a scene located in front of the single lens;
an optical array, wherein the optical array comprises a plurality of optical elements, wherein each optical element in the optical array is configured to refract light from the single lens; and
an objective lens positioned proximate to an image plane of the optical array, wherein the objective lens is configured to refract light from the optical array;
wherein the optical array is positioned between the single lens and the objective lens and proximate to the single lens so that distance between the single lens and the optical array is small relative to distance from the optical array to the image plane of the optical array such that the single lens and the optical array are located at substantially a same optical plane to form the image plane as an optical unit;
a photosensor configured to capture light projected onto the photosensor from the optical system;
wherein the optical system is configured to project a plurality of separate images of the scene onto the photosensor, wherein each of the plurality of separate images is projected onto a separate location on the photosensor;
wherein the plurality of separate images of the scene projected onto the photosensor by the optical system form an array of the separate images that includes radiance information, wherein the radiance information indicates distribution of intensity of the light in multiple directions at multiple points.

9. The apparatus as recited in claim 8, wherein the optical elements in the optical array are negative lenses.

10. The apparatus as recited in claim 8, wherein the photosensor is a charge-coupled device (CCD).

11. The apparatus as recited in claim 8, wherein the photosensor is configured to capture a light-field image that includes each of the separate images of the scene projected onto the photosensor by the optical system in a separate region of the light-field image.

12. The apparatus as recited in claim 8, wherein the apparatus is a hand-held camera.

13. A method for capturing light-field images, comprising:
receiving light from a scene at an objective lens of a camera;
receiving light from the objective lens at a multidimensional optical array located between the objective lens and a photosensor of the camera, wherein the optical array comprises a plurality of optical elements, and wherein the optical array is proximate to the objective lens so that distance between the objective lens and the optical array is small relative to distance from the optical array to an image plane of the optical array such that the objective lens and the optical array are located at substantially a same optical plane to form the image plane as an optical unit;
receiving light from the optical array at the photosensor, wherein the photosensor is positioned proximate to the image plane, and wherein the photosensor receives a different image of the scene from each optical element in the array at a separate location on the photosensor; and
capturing the different images of the scene at the photosensor as a light-field image;
wherein the different images of the scene projected onto the photosensor by the optical array form a multidimensional array of the different images that includes radiance information, wherein the radiance information indicates distribution of intensity of the light in multiple directions at multiple points.

14. The method as recited in claim 13, wherein the optical elements in the optical array are positive lenses.

15. The method as recited in claim 13, wherein the optical elements in the optical array are negative lenses.

16. The method as recited in claim 13, wherein the optical elements in the optical array are prisms.

17. The method as recited in claim 13, wherein the photosensor is a charge-coupled device (CCD).

18. A method for capturing light-field images, comprising:
receiving light from a scene at a single lens;
receiving light from the single lens at an optical array located between the single lens and an objective lens of a camera, wherein the optical array comprises a plurality of optical elements, and wherein the optical array is proximate to the single lens so that distance between the single lens and the optical array is small relative to distance from the optical array to an image plane of the optical array such that the single lens and the optical array are located at substantially a same optical plane to form the image plane as an optical unit;
receiving light from the optical array at the objective lens of the camera, wherein the objective lens is positioned proximate to the image plane of the optical array; receiving light from the objective lens at a photosensor of the camera, wherein the photosensor receives a different image of the scene from each optical element in the array; and
capturing the different images of the scene at the photosensor as a light-field image;
wherein the different images of the scene projected onto the photosensor by the optical array form an array of the different images that includes radiance information, wherein the radiance information indicates distribution of intensity of the light in multiple directions at multiple points.

19. The method as recited in claim 18, wherein the optical elements in the optical array are negative lenses.

20. The method as recited in claim 18, wherein the photosensor is a charge-coupled device (CCD).

21. An apparatus, comprising:
a lens, wherein the lens is configured to refract light from a scene located in front of the lens; and
a multidimensional optical array, wherein the optical array comprises a plurality of optical elements, wherein each optical element in the optical array is configured to refract light from the lens;
wherein the optical array is positioned with respect to the lens to produce via light received through the lens a plurality of separate images of the scene at an image plane, and wherein distance between the lens and the optical array is small relative to distance from the optical array to the image plane such that the lens and the optical array are located at substantially a same optical plane to form the image plane as an optical unit;
wherein the separate images of the scene produced at the image plane form a multidimensional array of the separate images that includes radiance information, wherein the radiance information indicates distribution of intensity of the light in multiple directions at multiple points.

22. The apparatus as recited in claim 21, wherein the optical elements in the optical array are positive lenses.

23. The apparatus as recited in claim 21, wherein the optical elements in the optical array are negative lenses.

24. The apparatus as recited in claim 21, wherein the optical elements in the optical array are prisms.

25. The apparatus as recited in claim 21, wherein the apparatus is configured to attach to a camera comprising an objective lens and a photosensor so that the objective lens is positioned proximate to the image plane of the apparatus.

26. The apparatus as recited in claim 25, wherein the apparatus is configured to attach to the camera so that the optical array is positioned between the lens of the apparatus and the objective lens of the camera and the objective lens of the camera is positioned between the apparatus and the photosensor.

27. The apparatus as recited in claim 21, wherein the apparatus is configured to attach to a camera comprising a photosensor, wherein the optical array is positioned between the lens and the photosensor and proximate to the lens, wherein the lens of the apparatus acts as the objective lens of the camera, and wherein the photosensor is positioned proximate to the image plane of the apparatus.

28. An apparatus, comprising:
a multidimensional objective lens array comprising a plurality of discrete objective lenses, wherein each lens in the objective lens array is configured to refract light received directly from a scene located in front of the camera; and
a photosensor configured to capture light projected onto the photosensor from the objective lens array, wherein the lenses in the objective lens array are positioned such that the optical axes of the lenses are parallel to each other and perpendicular to a light-capturing surface of the photosensor;
wherein each lens of the objective lens array receives light from the scene from a different angle than the other lenses in the objective lens array and consequently projects a view of the scene onto the photosensor, whereby the photosensor receives a different view of the scene from each lens in the objective lens array, wherein each different view of the scene is received at a separate location on the photosensor to produce an array of different views of the scene at the photosensor;
wherein the array of different views of the scene includes radiance information, wherein the radiance information indicates distribution of intensity of the light in multiple directions at multiple points; and
wherein the objective lens array and the photosensor are arranged within a single camera; and
a processing module operable to render multiple different output images of the scene from the array of different views of the scene received at the photosensor, each different output image focused at a different depth in the scene or with a different depth of field.

29. The apparatus as recited in claim 28, wherein the processing module is further operable to generate additional different views of the scene from the array of different views of the scene according to a view morphing technique, wherein the additional different views of the scene are combined with the array of different views to render the multiple different output images.

30. The apparatus as recited in claim 28, wherein the plurality of discrete objective lenses are arranged in the objective lens array in two or more rows, wherein adjacent rows are shifted relative to each other such that columns formed by the lenses in the array are non-orthogonal to the rows.

31. The apparatus as recited in claim 28, wherein the lenses are of a geometric shape other than rectangular or square.

* * * * *